US012659928B2

(12) United States Patent
Ly

(10) Patent No.: US 12,659,928 B2
(45) Date of Patent: Jun. 16, 2026

(54) CONFIGURABLE PAGING SCHEMES FOR WIRELESS COMMUNICATIONS

(71) Applicant: QUALCOMM Incorporated, San Diego, CA (US)

(72) Inventor: Hung Dinh Ly, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 315 days.

(21) Appl. No.: 18/443,029

(22) Filed: Feb. 15, 2024

(65) Prior Publication Data

US 2025/0267627 A1 Aug. 21, 2025

(51) Int. Cl.
| | |
|---|---|
| *H04W 68/02* | (2009.01) |
| *H04W 24/08* | (2009.01) |
| *H04W 72/232* | (2023.01) |
| *H04W 76/28* | (2018.01) |

(52) U.S. Cl.
CPC ........... *H04W 68/02* (2013.01); *H04W 24/08* (2013.01); *H04W 72/232* (2023.01); *H04W 76/28* (2018.02)

(58) Field of Classification Search
None
See application file for complete search history.

(56) References Cited

U.S. PATENT DOCUMENTS

| | | | |
|---|---|---|---|
| 2019/0281580 A1* | 9/2019 | Rune | H04W 76/28 |
| 2022/0377671 A1* | 11/2022 | Höglund | H04W 68/00 |

OTHER PUBLICATIONS

3GPP: "3rd Generation Partnership Project, Technical Specification Group Radio Access Network, NR, Radio Resource Control (RRC) Protocol Specification (Release 17)", 3GPP TS 38.331 V17.7.0, Dec. 2023, 3GPP Organizational Partners, Sophia Antipolis Valbonne, France, 1342 Pages, pp. 597-602.
3GPP: "3rd Generation Partnership Project, Technical Specification Group Radio Access Network, NR, User Equipment (UE) Procedures in Idle Mode and RRC Inactive State (Release 17)", 3GPP TS 38.304 V17.7.0, Dec. 2023, 53 Pages, 3GPP Organizational Partners, Sophia Antipolis Valbonne, France, pp. 42-44.

* cited by examiner

*Primary Examiner* — Frantz Bataille
(74) *Attorney, Agent, or Firm* — Holland & Hart LLP

(57) ABSTRACT

Methods, systems, and devices for wireless communications are described. The described techniques provide for a network entity to flexibly configure a paging allocation scheme for communicating during one or more paging occasions (POs). The network entity may configure a paging allocation scheme such that POs occur during contiguous radio frames during a discontinuous reception (DRX) cycle of a user equipment (UE). In some cases, the network entity may indicate, to one or more UEs, a set of paging parameters as well as an indication of whether the UEs are to monitor for POs according to a first paging allocation scheme or a second paging allocation scheme, where the first paging allocation scheme may distribute paging occasions across non-contiguous radio frames of the DRX cycle and the second paging allocation scheme may condense the paging occasions into contiguous radio frames of the DRX cycle.

30 Claims, 15 Drawing Sheets

Paging Cycle 325

DRX Cycle 320

Paging Allocation Scheme 305-a

Paging Allocation Scheme 305-b

Additional Radio Frame(s) 330

Paging Allocation Scheme 305-c

Paging Frame 310　　　　Paging Occasion 315

300

115-b 105-b

System Information

505

Updated Paging Parameters

510

515

Determine
Paging Occasion

520

Monitor Paging
Occasion

Paging Transmission(s)

525

500

Control Information Reception Component

825

Wireless Channel Monitoring Component

830

Paging Allocation Identification Component

835

820

800

1010

1020

1015

1005

1000

130

105

115

Network
Entity

Transceiver

Antenna

1310

1315

Communications
Manager

Memory

Code

1330

1320

1325

1340

Processor

1335

1305

1300

Figure 14:
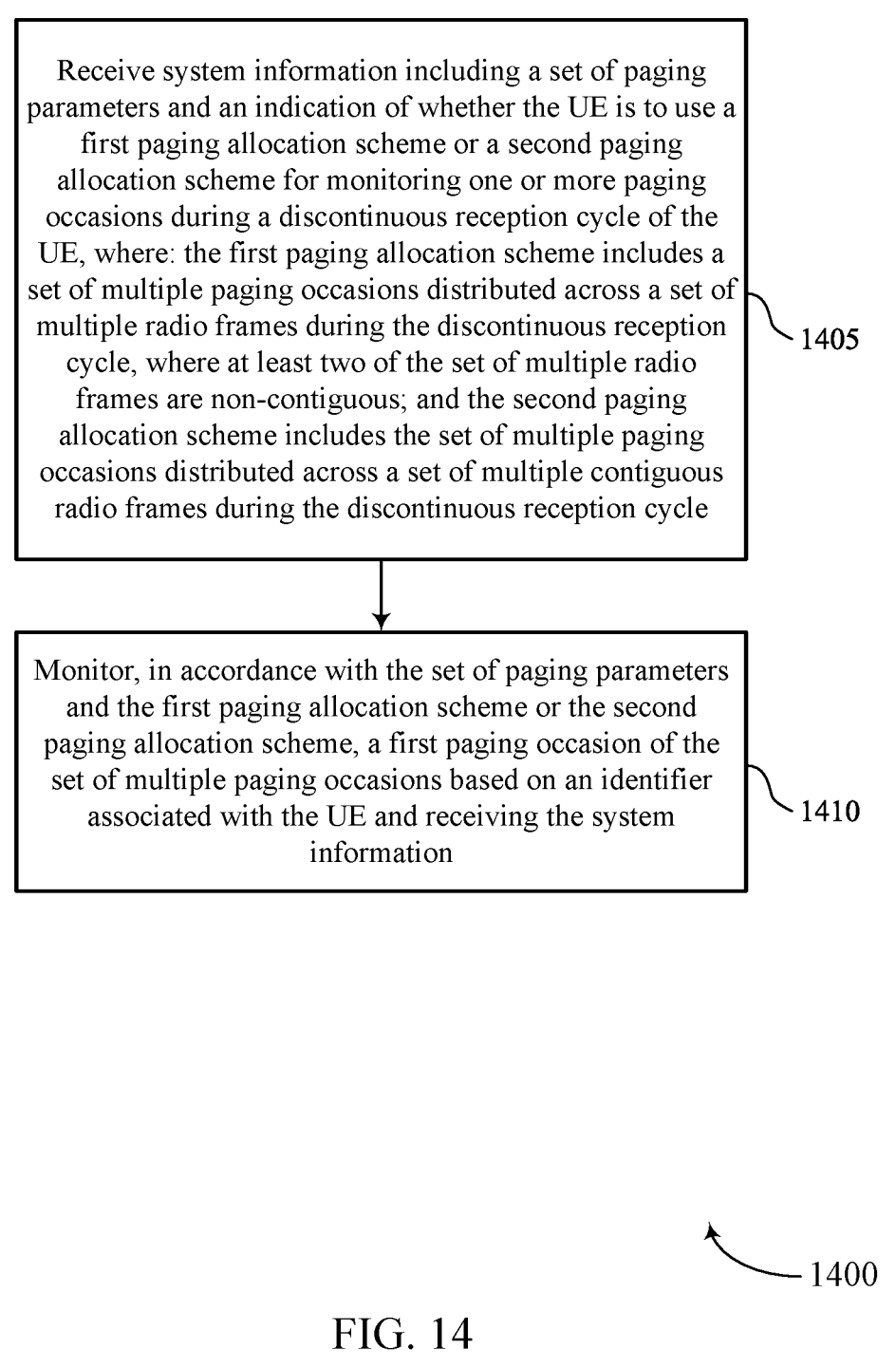

Receive system information including a set of paging parameters and an indication of whether the UE is to use a first paging allocation scheme or a second paging allocation scheme for monitoring one or more paging occasions during a discontinuous reception cycle of the UE, where: the first paging allocation scheme includes a set of multiple paging occasions distributed across a set of multiple radio frames during the discontinuous reception cycle, where at least two of the set of multiple radio frames are non-contiguous; and the second paging allocation scheme includes the set of multiple paging occasions distributed across a set of multiple contiguous radio frames during the discontinuous reception cycle

1405

Monitor, in accordance with the set of paging parameters and the first paging allocation scheme or the second paging allocation scheme, a first paging occasion of the set of multiple paging occasions based on an identifier associated with the UE and receiving the system information

Figure 15:
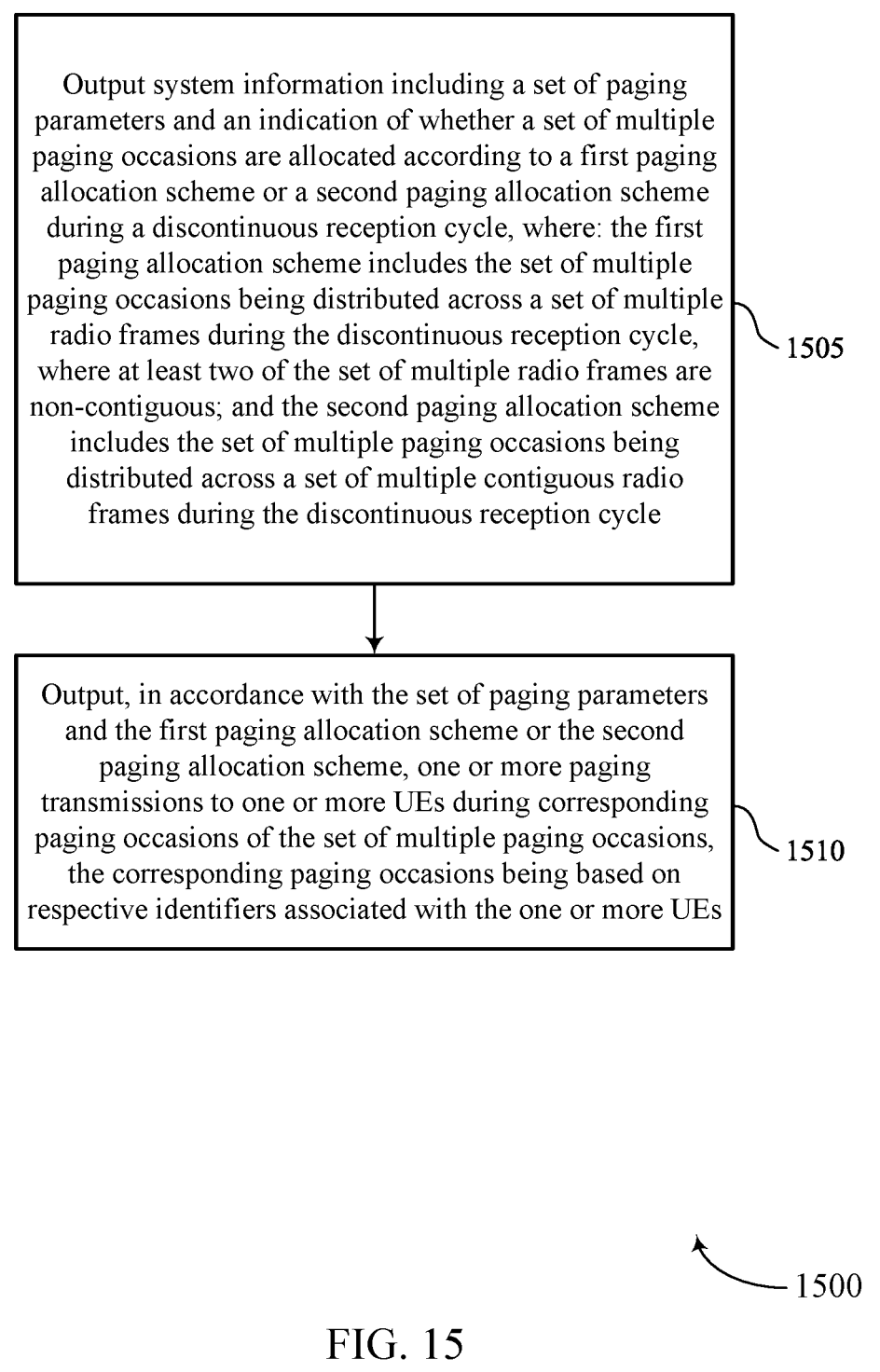

Output system information including a set of paging parameters and an indication of whether a set of multiple paging occasions are allocated according to a first paging allocation scheme or a second paging allocation scheme during a discontinuous reception cycle, where: the first paging allocation scheme includes the set of multiple paging occasions being distributed across a set of multiple radio frames during the discontinuous reception cycle, where at least two of the set of multiple radio frames are non-contiguous; and the second paging allocation scheme includes the set of multiple paging occasions being distributed across a set of multiple contiguous radio frames during the discontinuous reception cycle

1505

Output, in accordance with the set of paging parameters and the first paging allocation scheme or the second paging allocation scheme, one or more paging transmissions to one or more UEs during corresponding paging occasions of the set of multiple paging occasions, the corresponding paging occasions being based on respective identifiers associated with the one or more UEs

CONFIGURABLE PAGING SCHEMES FOR WIRELESS COMMUNICATIONS

FIELD OF TECHNOLOGY

The following relates to wireless communications, including configurable paging schemes for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a network entity may transmit paging transmissions to one or more UEs to indicate whether data is ready for the one or more UEs, such as when the UEs operate according to a discontinuous reception (DRX) cycle. For example, the network entity may configure paging occasions during which the UEs are to monitor for paging transmissions during the DRX cycle (e.g., an active duration of the DRX cycle).

SUMMARY

The described techniques relate to improved methods, systems, devices, and apparatuses that support configurable paging schemes for wireless communications. For example, the described techniques provide for a network entity to flexibly configure a paging allocation scheme for communicating during one or more paging occasions (POs). The network entity may configure a paging allocation scheme such that POs occur during contiguous (e.g., consecutive in time) radio frames instead of the POs occurring during non-contiguous radio frames distributed across a discontinuous reception (DRX) cycle of a user equipment (UE). In some examples, consolidating POs to occur during contiguous radio frames may support power savings at the network entity. For example, the network entity may enter a network energy savings (NES) mode after communicating paging transmissions during the contiguous radio frames (e.g., entering a low power mode during radio frames which otherwise would include POs). In some cases, the network entity may indicate, to one or more UEs, a set of paging parameters (e.g., a quantity of paging frames configured during a DRX cycle, a quantity of paging occasions included in one paging frame, a duration of a paging cycle, or the like) as well as an indication of whether the UEs are to monitor for POs according to a first paging allocation scheme or a second paging allocation scheme, where the first paging allocation scheme may distribute paging occasions across non-contiguous radio frames of the DRX cycle and the second paging allocation scheme may condense the paging occasions into contiguous radio frames of the DRX cycle.

A method for wireless communications by a UE is described. The method may include receiving system information including a set of paging parameters and an indication of whether the UE is to use a first paging allocation scheme or a second paging allocation scheme for monitoring one or more POs during a DRX cycle of the UE, where: the first paging allocation scheme includes a set of multiple POs distributed across a set of multiple radio frames during the DRX cycle, where at least two of the set of multiple radio frames are non-contiguous; and the second paging allocation scheme includes the set of multiple POs distributed across a set of multiple contiguous radio frames during the DRX cycle and monitoring, in accordance with the set of paging parameters and the first paging allocation scheme or the second paging allocation scheme, a first PO of the set of multiple POs based on an identifier (ID) associated with the UE and receiving the system information.

A UE for wireless communications is described. The UE may include one or more memories storing processor executable code, and one or more processors coupled with the one or more memories. The one or more processors may individually or collectively be operable to execute the code to cause the UE to receive system information including a set of paging parameters and an indication of whether the UE is to use a first paging allocation scheme or a second paging allocation scheme for monitoring one or more POs during a DRX cycle of the UE, where: the first paging allocation scheme includes a set of multiple POs distributed across a set of multiple radio frames during the DRX cycle, where at least two of the set of multiple radio frames are non-contiguous; and the second paging allocation scheme includes the set of multiple POs distributed across a set of multiple contiguous radio frames during the DRX cycle and monitor, in accordance with the set of paging parameters and the first paging allocation scheme or the second paging allocation scheme, a first PO of the set of multiple POs based on an ID associated with the UE and receiving the system information.

Another UE for wireless communications is described. The UE may include means for receiving system information including a set of paging parameters and an indication of whether the UE is to use a first paging allocation scheme or a second paging allocation scheme for monitoring one or more POs during a DRX cycle of the UE, where: the first paging allocation scheme includes a set of multiple POs distributed across a set of multiple radio frames during the DRX cycle, where at least two of the set of multiple radio frames are non-contiguous; and the second paging allocation scheme includes the set of multiple POs distributed across a set of multiple contiguous radio frames during the DRX cycle and means for monitoring, in accordance with the set of paging parameters and the first paging allocation scheme or the second paging allocation scheme, a first PO of the set of multiple POs based on an ID associated with the UE and receiving the system information.

A non-transitory computer-readable medium storing code for wireless communications is described. The code may include instructions executable by one or more processors to receive system information including a set of paging parameters and an indication of whether the UE is to use a first paging allocation scheme or a second paging allocation scheme for monitoring one or more POs during a DRX cycle of the UE, where: the first paging allocation scheme includes a set of multiple POs distributed across a set of multiple radio frames during the DRX cycle, where at least two of the set of multiple radio frames are non-contiguous; and the second paging allocation scheme includes the set of multiple POs distributed across a set of multiple contiguous radio frames during the DRX cycle and monitor, in accordance with the set of paging parameters and the first paging allocation scheme or the second paging allocation scheme, a first PO of the set of multiple POs based on an ID associated with the UE and receiving the system information.

In some examples of the method, UEs, and non-transitory computer-readable medium described herein, the set of paging parameters indicates a set of multiple paging frames, each paging frame of the set of multiple paging frames associated with a respective subset of POs of the set of multiple POs; and the set of multiple contiguous radio frames include the set of multiple paging frames.

In some examples of the method, UEs, and non-transitory computer-readable medium described herein, the set of paging parameters indicates a single paging frame that may be associated with the set of multiple POs; and an initial radio frame of the set of multiple contiguous radio frames aligns, in a time domain, with the single paging frame.

Some examples of the method, UEs, and non-transitory computer-readable medium described herein may further include operations, features, means, or instructions for receiving a downlink control information (DCI) message indicating a second set of paging parameters, where the second set of paging parameters includes one or more updated paging parameters for the UE to use for monitoring the one or more POs.

In some examples of the method, UEs, and non-transitory computer-readable medium described herein, the DCI message includes a paging DCI message, a DCI message that schedules a paging message that includes the second set of paging parameters, a DCI message including a paging early indication, a DCI message communicated via a common search space, or any combination thereof.

Some examples of the method, UEs, and non-transitory computer-readable medium described herein may further include operations, features, means, or instructions for determining a time domain location of the first PO within the set of multiple POs based on the ID associated with the UE, where monitoring the first PO may be based on determining the time domain location of the first PO.

In some examples of the method, UEs, and non-transitory computer-readable medium described herein, a starting time domain location of the set of multiple contiguous radio frames may be based on a start of the DRX cycle and a paging frame offset value and the paging frame offset value may be indicated by the set of paging parameters.

Some examples of the method, UEs, and non-transitory computer-readable medium described herein may further include operations, features, means, or instructions for receiving a DCI message indicating a synchronization signal block (SSB) muting pattern for the first PO, where the SSB muting pattern indicates to mute one or more SSBs of a set of multiple SSBs associated with the first PO.

Some examples of the method, UEs, and non-transitory computer-readable medium described herein may further include operations, features, means, or instructions for determining a time domain location of a first radio frame including the first PO based on the set of paging parameters indicating a first paging frame, where the first paging frame indicates a starting radio frame associated with a set of POs including the first PO.

In some examples of the method, UEs, and non-transitory computer-readable medium described herein, the starting radio frame may be the first radio frame; or the starting radio frame may be a second radio frame that occurs prior to the first radio frame.

In some examples of the method, UEs, and non-transitory computer-readable medium described herein, the set of paging parameters includes a quantity of paging frames included during the DRX cycle, a quantity of POs included in each paging frame of the quantity of paging frames, a duration corresponding to a paging cycle, an indication of an initial physical downlink control channel (PDCCH) monitoring occasion (PMO) within a PO, or any combination thereof.

A method for wireless communications by a network entity is described. The method may include outputting system information including a set of paging parameters and an indication of whether a set of multiple POs are allocated according to a first paging allocation scheme or a second paging allocation scheme during a DRX cycle, where: the first paging allocation scheme includes the set of multiple POs being distributed across a set of multiple radio frames during the DRX cycle, where at least two of the set of multiple radio frames are non-contiguous; and the second paging allocation scheme includes the set of multiple POs being distributed across a set of multiple contiguous radio frames during the DRX cycle and outputting, in accordance with the set of paging parameters and the first paging allocation scheme or the second paging allocation scheme, one or more paging transmissions to one or more UEs during corresponding POs of the set of multiple POs, the corresponding POs being based on respective IDs associated with the one or more UEs.

A network entity for wireless communications is described. The network entity may include one or more memories storing processor executable code, and one or more processors coupled with the one or more memories. The one or more processors may individually or collectively be operable to execute the code to cause the network entity to output system information including a set of paging parameters and an indication of whether a set of multiple POs are allocated according to a first paging allocation scheme or a second paging allocation scheme during a DRX cycle, where: the first paging allocation scheme includes the set of multiple POs being distributed across a set of multiple radio frames during the DRX cycle, where at least two of the set of multiple radio frames are non-contiguous; and the second paging allocation scheme includes the set of multiple POs being distributed across a set of multiple contiguous radio frames during the DRX cycle and output, in accordance with the set of paging parameters and the first paging allocation scheme or the second paging allocation scheme, one or more paging transmissions to one or more UEs during corresponding POs of the set of multiple POs, the corresponding POs being based on respective IDs associated with the one or more UEs.

Another network entity for wireless communications is described. The network entity may include means for outputting system information including a set of paging parameters and an indication of whether a set of multiple POs are allocated according to a first paging allocation scheme or a second paging allocation scheme during a DRX cycle, where: the first paging allocation scheme includes the set of multiple POs being distributed across a set of multiple radio frames during the DRX cycle, where at least two of the set of multiple radio frames are non-contiguous; and the second paging allocation scheme includes the set of multiple POs being distributed across a set of multiple contiguous radio frames during the DRX cycle and means for outputting, in accordance with the set of paging parameters and the first paging allocation scheme or the second paging allocation scheme, one or more paging transmissions to one or more UEs during corresponding POs of the set of multiple POs, the corresponding POs being based on respective IDs associated with the one or more UEs.

A non-transitory computer-readable medium storing code for wireless communications is described. The code may include instructions executable by one or more processors to output system information including a set of paging parameters and an indication of whether a set of multiple POs are allocated according to a first paging allocation scheme or a second paging allocation scheme during a DRX cycle, where: the first paging allocation scheme includes the set of multiple POs being distributed across a set of multiple radio frames during the DRX cycle, where at least two of the set of multiple radio frames are non-contiguous; and the second paging allocation scheme includes the set of multiple POs being distributed across a set of multiple contiguous radio frames during the DRX cycle and output, in accordance with the set of paging parameters and the first paging allocation scheme or the second paging allocation scheme, one or more paging transmissions to one or more UEs during corresponding POs of the set of multiple POs, the corresponding POs being based on respective IDs associated with the one or more UEs.

In some examples of the method, network entities, and non-transitory computer-readable medium described herein, the set of paging parameters indicates a set of multiple paging frames, each paging frame of the set of multiple paging frames associated with a respective subset of POs of the set of multiple POs; and the set of multiple contiguous radio frames include the set of multiple paging frames.

In some examples of the method, network entities, and non-transitory computer-readable medium described herein, the set of paging parameters indicates a single paging frame that may be associated with the set of multiple POs; and an initial radio frame of the set of multiple contiguous radio frames aligns, in a time domain, with the single paging frame.

Some examples of the method, network entities, and non-transitory computer-readable medium described herein may further include operations, features, means, or instructions for outputting a DCI message indicating a second set of paging parameters, where the second set of paging parameters includes one or more updated paging parameters for the one or more UEs to use for monitoring the corresponding POs.

In some examples of the method, network entities, and non-transitory computer-readable medium described herein, the DCI message includes a paging DCI message, a DCI message that schedules a paging message that indicates the second set of paging parameters, a DCI message including a paging early indication, a DCI message communicated via a common search space, or any combination thereof.

In some examples of the method, network entities, and non-transitory computer-readable medium described herein, a starting time domain location of the set of multiple contiguous radio frames may be based on a start of the DRX cycle and a paging frame offset value and the paging frame offset value may be indicated by the set of paging parameters.

Some examples of the method, network entities, and non-transitory computer-readable medium described herein may further include operations, features, means, or instructions for outputting a DCI message indicating a SSB muting pattern for the corresponding POs, where the SSB muting pattern indicates to mute one or more SSBs of a set of multiple SSBs associated with the corresponding POs.

In some examples of the method, network entities, and non-transitory computer-readable medium described herein, the set of paging parameters includes a quantity of paging frames included during the DRX cycle, a quantity of POs included in each paging frame of the quantity of paging frames, a duration corresponding to a paging cycle, an indication of an initial PMO within a PO, or any combination thereof.

BRIEF DESCRIPTION OF THE DRAWINGS

FIGS. 14 and 15 show flowcharts illustrating methods that support configurable paging schemes for wireless communications in accordance with one or more aspects of the present disclosure.

DETAILED DESCRIPTION

Figure 1:
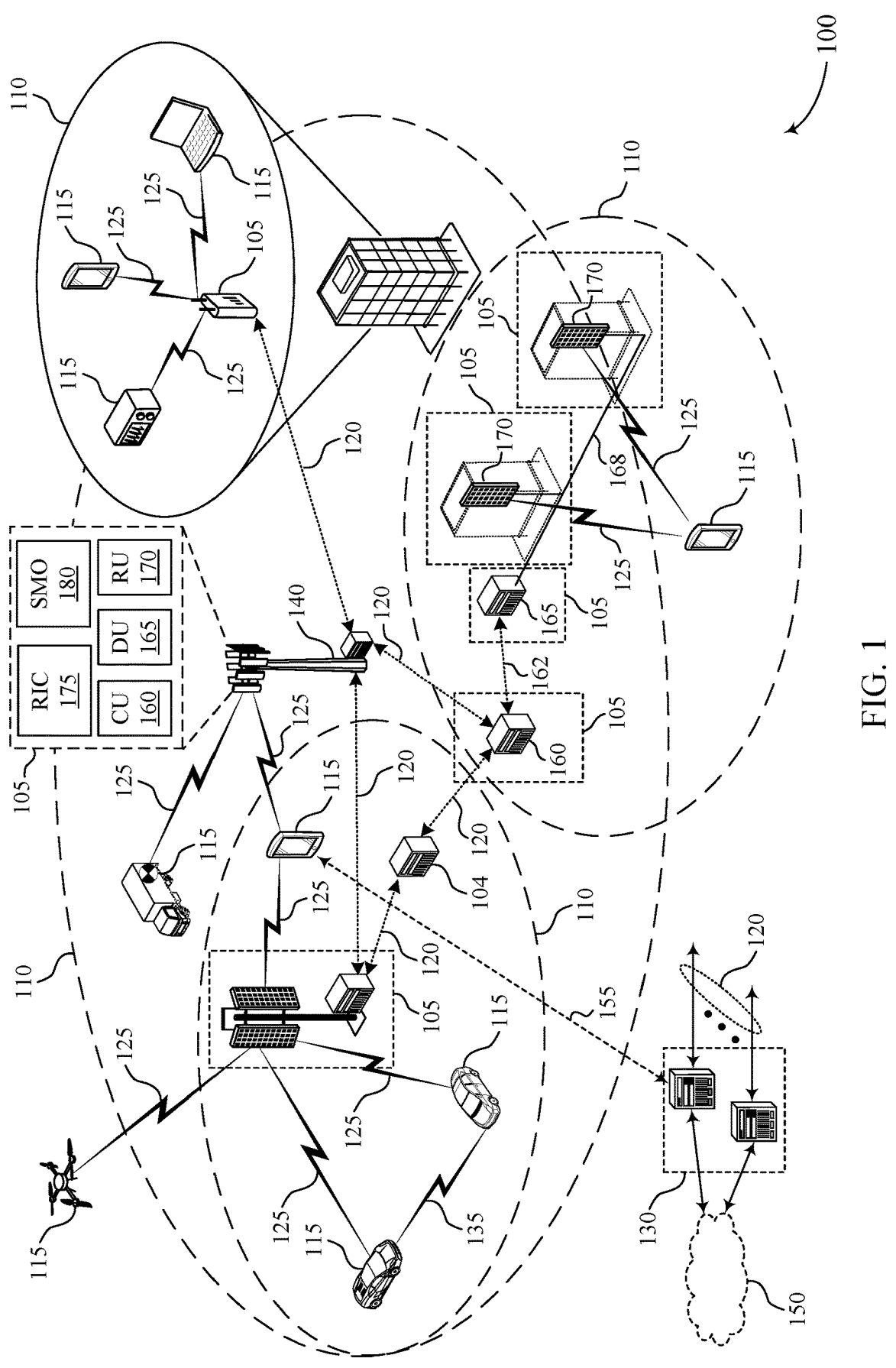
FIG. 1 shows an example of a wireless communications system that supports configurable paging schemes for wireless communications in accordance with one or more aspects of the present disclosure.

In some wireless communications systems, a network entity may transmit paging transmissions to one or more user equipments (UEs) to indicate whether data is ready for communication with the one or more UEs. For example, a UE may operate according to a discontinuous reception (DRX) cycle, where the UE may monitor for transmissions during an active duration of the DRX cycle (e.g., a high power state) and where the UE may not monitor for transmissions during an inactive duration of the DRX cycle (e.g., a low power state). In some cases, the network entity may configure paging transmissions to occur during a set of paging occasions (POs) distributed across a set of multiple paging frames during a paging cycle, which may align with the DRX cycle based on a paging offset value (e.g., one or more radio frames). For example, the network entity may distribute the multiple paging frames such that the paging frames align with radio frames uniformly distributed across the paging cycle, where each paging frame may include a set of one or more POs. However, such a distribution may result in the network entity remaining active for a relatively large portion of the paging cycle, which may increase a power expenditure at the network entity (e.g., such as when the network entity is operable to transition to a network energy savings (NES) mode).

In some examples, a network entity may configure a paging allocation scheme such that POs are condensed within a paging cycle. For example, in such a paging allocation scheme, the network entity may configure POs to occur during a set of contiguous radio frames, which may be located, in a time domain, at the start of the paging cycle. In some cases, the network entity may transmit a system information (SI) message to one or more UEs served by the network entity indicating whether the UEs are to use such a paging allocation scheme. For example, the SI message may indicate a set of paging parameters and may indicate a first paging allocation scheme with POs distributed throughout the paging cycle or a second paging allocation scheme with POs consolidated to contiguous radio frames of the paging cycle. In some cases, a network entity may identify whether to use the first paging allocation scheme or the second paging allocation scheme based on capabilities of the UEs (e.g., UEs supporting relatively higher capabilities may support the second paging allocation scheme). Additionally, or alternatively, the network entity may reconfigure (e.g., update) the set of paging parameters used by the UEs for monitoring POs via dynamic signaling, such as via a downlink control information (DCI) message. Such techniques may support flexible allocations for POs during a paging cycle, which may support reduced power expenditure at a network entity and improved paging response times.

Aspects of the disclosure are initially described in the context of wireless communications systems. Aspects of the disclosure are further illustrated by and described with reference to paging allocation schemes, a PO configuration, and a process flow. Aspects of the disclosure are further illustrated by and described with reference to apparatus diagrams, system diagrams, and flowcharts that relate to configurable paging schemes for wireless communications.

FIG. 1 shows an example of a wireless communications system 100 that supports configurable paging schemes for wireless communications in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some examples of the wireless communications system 100, a network entity 105 may transmit paging transmissions to one or more UEs 115 served by the network entity 105 to indicate whether data is ready for communications with the one or more UEs 115. For example, a UE 115 may operate according to a DRX cycle, where the UE 115 may monitor for paging transmissions during an active duration of the DRX cycle (e.g., a high power state) and where the UE 115 may not monitor for paging transmissions during an inactive duration of the DRX cycle (e.g., a low power state). In some cases, the network entity 105 may configure paging transmissions to occur during a set of POs distributed across a set of multiple paging frames during the paging cycle. For example, the network entity 105 may distribute the multiple paging frames such that the paging frames align with radio frames uniformly distributed across the paging cycle (e.g., which may be aligned with a DRX cycle of the UE 115 according to a paging offset), where each paging frame may include a set of one or more POs. However, such a distribution may result in the network entity 105 remaining active during a relatively large portion of the paging cycle, which may increase a power expenditure at the network entity 105 (e.g., such as when the network entity is operable to transition to a NES mode). For example, the network entity 105 may transition to a high power state (e.g., exit the NES mode or 'wake up') to communicate paging transmissions during POs via configured paging frames even if paged UEs 115 are not in a coverage area of the network entity 105 (e.g., the network entity 105 may unaware of a location of IDLE mode UEs 115 within a paging tracking area and may broadcast paging transmissions regardless of whether a UE 115 is available to respond).

In some examples, a network entity 105 may configure a paging allocation scheme such that POs are consolidated within contiguous radio frames of a paging cycle. For example, in such a paging allocation scheme, the network entity 105 may configure POs to occur during a set of contiguous radio frames, which may be located, in a time domain, at a beginning of the paging cycle. In some cases, the network entity 105 may transmit a SI message to one or more UEs 115 served by the network entity indicating whether the UEs 115 are to use such a paging allocation scheme. For example, the SI message may indicate a set of paging parameters as well as a first paging allocation scheme with POs distributed throughout the paging cycle or a second paging allocation scheme with POs consolidated to contiguous radio frames of the paging cycle. Additionally, or alternatively, the network entity 105 may indicate a paging allocation scheme for the one or more UEs 115 to use via one or more control messages, such as an RRC message (e.g., an RRC reconfiguration message), a MAC control element (MAC-CE), a DCI message, or any combination thereof. In some cases, the network entity 105 may identify whether to use the first paging allocation scheme or the second paging allocation scheme based on capabilities of the UEs 115 (e.g., UEs 115 supporting relatively higher capabilities may support the second paging allocation scheme). Additionally, or alternatively, the network entity 105 may configure (e.g., update) the set of paging parameters used by the UEs 115 for monitoring POs via dynamic signaling, such as via a DCI message. Such techniques may support flexible allocations for POs during a paging cycle, which may support reduced power expenditure at a network entity 105.

Figure 2:
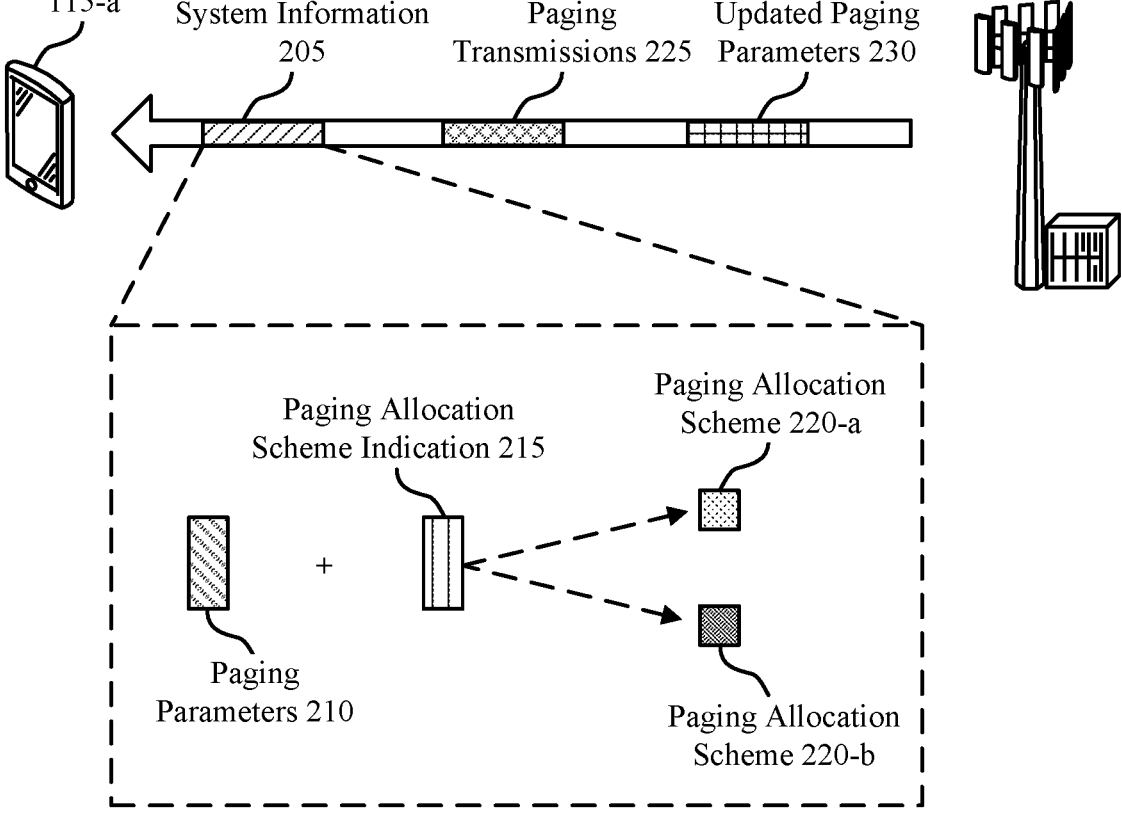
FIG. 2 shows an example of a wireless communications system that supports configurable paging schemes for wireless communications in accordance with one or more aspects of the present disclosure.

FIG. 2 shows an example of a wireless communications system 200 that supports configurable paging schemes for wireless communications in accordance with one or more aspects of the present disclosure. The wireless communications system 200 may implement, or be implemented by, one or more aspects of the wireless communications system 100. For example, the wireless communications system 200 may include examples of signaling between a UE 115-*a* and a network entity 105-*a*, which may be examples of corresponding devices described with reference to FIG. 1. In some cases, the wireless communications system 200 may support the network entity 105-*a* communicating paging transmissions to the UE 115-*a* in accordance with a paging allocation scheme, which the network entity 105-*a* may configure according to capabilities of one or more UEs 115 (e.g., including at least the UE 115-*a*) served by the network entity 105-*a*.

In some cases, the network entity 105-*a* may transmit paging transmissions to the UE 115-*a* to indicate whether data is ready for the UE 115-*a* (e.g., mobile terminated (MT) data for the UE 115-*a*). For example, the UE 115-*a* may operate according to a DRX cycle, where the UE 115-*a* may actively monitor for paging transmissions during an active duration of the DRX cycle (e.g., a high power mode) and where the UE 115-*a* may refrain from monitoring for paging transmissions during an inactive duration of the DRX cycle (e.g., a low power mode). If the UE 115-*a* receives a paging transmission during the active duration of the DRX cycle, the UE 115-*a* may communicate the data (e.g., the UE 115-*a* may not transition to the low power mode and remain active to communicate the data). In some examples, the network entity 105-*a* may communicate paging transmissions via one or more POs (e.g., time-frequency resource allocations for communicating paging transmissions). For example, the network entity 105-*a* may configure one or more paging frames to occur during the DRX cycle of the UE 115-*a* where each paging frame may include a set of one or more POs.

In some examples, the network entity 105-*a* may transmit a SI message 205 to the UE 115-*a* indicating information associated with communicating paging transmissions. For example, the SI message 205 may include a set of paging parameters 210 indicating a configuration of a paging cycle (e.g., a periodic set of one or more paging frames and corresponding POs). In some cases, the set of paging parameters may include a duration associated with a paging cycle (e.g., a quantity of radio frames), a quantity of paging frames that occur during a paging cycle (e.g., N paging frames per paging cycle), a paging frame offset value (e.g., indicating a quantity of radio frames between a beginning of the DRX cycle and a first paging frame of the paging cycle), a quantity of POs that occur during each paging frame (e.g., $N_s$ POs per paging frame), a first physical downlink control channel (PDCCH) monitoring occasion (PMO) within a PO, or any combination thereof. As described herein, a paging frame may indicate a starting time domain location for a set of POs, which may align with a corresponding radio frame of the paging cycle. In some examples, a single paging frame may correspond to multiple radio frames, such as when a set of POs configured to occur during the paging frame extend beyond an initial radio frame aligned with the single paging frame.

Additionally, in some examples, the SI message 205 may include a paging allocation scheme indication 215. In some cases, the paging allocation scheme indication 215 may be an RRC parameter (e.g., in a system information block (SIB) 1). The paging allocation scheme indication 215 may indicate a paging allocation scheme 220 that the UE 115-*a* is to use for monitoring one or more POs during the DRX cycle. For example, the paging allocation scheme indication 215 may indicate a paging allocation scheme 220-*a* or a paging allocation scheme 220-b, which may indicate different allocations of POs across the paging cycle (e.g., as described in greater detail with respect to FIG. 3). In a first example, the paging allocation scheme indication 215 may indicate the paging allocation scheme 220-a, which may indicate POs distributed across non-contiguous radio frames of the paging cycle (e.g., respective sets of POs may occur during radio frames uniformly distributed across the paging cycle). In a second example, the paging allocation scheme indication 215 may indicate the paging allocation scheme 220-b, which may indicate POs distributed across condensed radio frames during the paging cycle (e.g., POs may occur during contiguous radio frames of the paging cycle). Although generally described as using contiguous radio frames, in some cases paging allocation scheme 220-b may use a condensed allocation of POs that may be non-contiguous but condensed within a region of the paging cycle. For example, the POs may occur during radio frames condensed within a region encompassing half, one-third, one-quarter, or some other fraction of radio frames of the paging cycle.

In some cases, after transmitting the SI message 205, the network entity 105-a may transmit one or more paging transmissions 225 to the UE 115-a in accordance with the set of paging parameters 210 and the paging allocation scheme 220 indicated by the paging allocation scheme indication 215. For example, the UE 115-a may monitor at least a first PO during at least one radio frame of the paging cycle based on whether the paging allocation scheme indication 215 indicates the paging allocation scheme 220-a or the paging allocation scheme 220-b. In some cases, the UE 115-a may determine a paging frame corresponding to the radio frame and the first PO to monitor from a set of POs communicated during the radio frame according to the set of paging parameters 210 and an identifier (ID) of the UE 115-a (e.g., $UE_{ID}$).

For example, the UE 115-a may identify a SFN associated with the paging frame according to the length of the paging cycle (e.g., duration T), a paging frame offset value (e.g., $PF_{offset}$), the quantity of paging frames configured during the DRX cycle (e.g., N), and the ID of the UE 115-a (e.g., the paging frame may be determined according to $$(SFN + PF_{offset}) \% T = \left(\frac{T}{N}\right) * (UE_{ID} \% N).$$

Additionally, a set of POs configured to occur during the paging frame may be associated with respective indices, and the UE 115-a may determine an index of a PO to monitor (e.g., index $i_s$) according to the ID of the UE 115-a, the quantity of paging frames configured during the DRX cycle (e.g., N), and the quantity of POs configured to occur during each paging frame (e.g., $N_s$, where is may be determined according to $$i_s = floor\left(\frac{UE_{ID}}{N}\right) \% N_s.$$

In some examples, the network entity 105-a may transmit updated paging parameters 230 to the UE 115-a. The updated paging parameters 230 may indicate one or more new paging parameters to replace one or more corresponding paging parameters indicated by the SI message 205 (e.g., updating the paging parameters 210). For example, the UE 115-a may use the updated paging parameters 230 for monitoring subsequent POs in accordance with the paging allocation scheme 220 indicated by the paging allocation scheme indication 215. In some examples, the network entity 105-a may transmit the updated paging parameters 230 via dynamic signaling. For example, the network entity 105-a may transmit the updated paging parameters 230 via a paging DCI message (e.g., DCI format 1_0 with DCI scrambled by a paging radio network temporary identifier (P-RNTI)), a paging message in a physical downlink shared channel (PDSCH) transmission scheduled by a paging DCI message, a DCI message including a paging early indication (e.g., DCI format 2_7), a DCI message communicated via a common search space (CSS) (e.g., a DCI with a dedicated RNTI), or any combination thereof. In some cases, such signaling may support updating the paging parameters without waiting for a subsequent SI message (e.g., due to SI being configured semi-statically, which may result in relatively infrequent transmissions of SI).

In some examples, the updated paging parameters 230 may further include a second paging allocation scheme indication 215 (e.g., updating the type of paging allocation scheme 220 dynamically). For example, a subsequent paging allocation scheme indication 215 may be included in a control message, such as an RRC message, a MAC-CE, a DCI message, or any combination thereof. Additionally, or alternatively, the updated paging parameters 230 may indicate a synchronization signal block (SSB) muting pattern that the UE 115-a is to use for monitoring a PO during the DRX cycle (e.g., as described in greater detail with reference to FIG. 4). For example, the PO may be configured to include multiple SSB transmissions, and the SSB muting pattern may indicate one or more of the multiple SSBs that will not be communicated (e.g., thereby reducing a duration associated with the PO).

In some cases, flexibly configuring a paging allocation scheme 220 according to capabilities of UEs 115 served by the network entity 105-a may support reduced power expenditure at the network entity 105-a (e.g., enabling the network entity 105-a to enter an NES mode while still communicating the paging transmissions 225).

Figure 3:
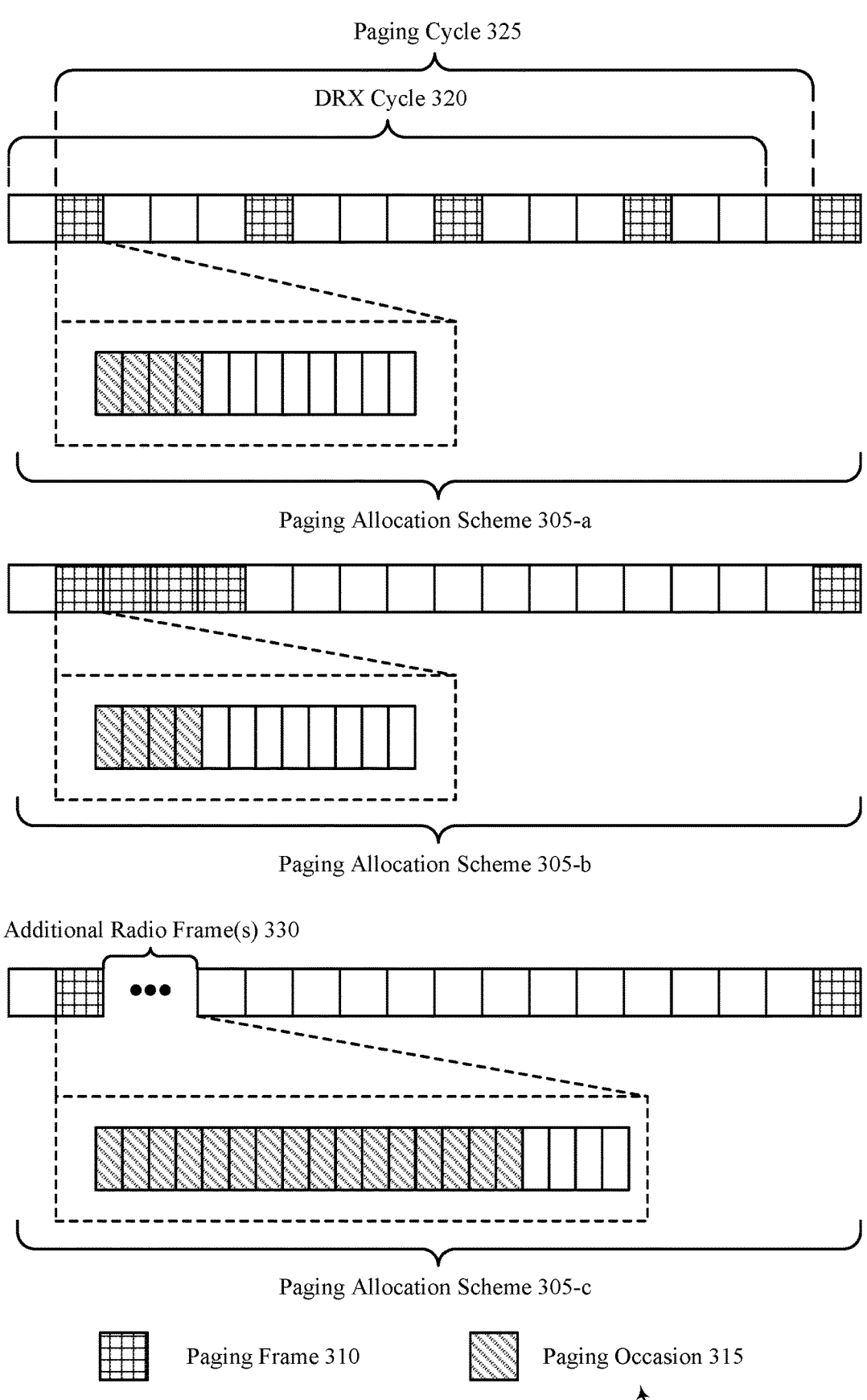
FIG. 3 shows examples of paging diagrams that support configurable paging schemes for wireless communications in accordance with one or more aspects of the present disclosure.

FIG. 3 shows examples of paging diagrams 300 that support configurable paging schemes for wireless communications in accordance with one or more aspects of the present disclosure. The paging diagrams 300 may implement, or be implemented by, one or more aspects of the wireless communications systems 100 and 200. For example, the paging diagrams 300 may be examples of distributions of POs communicated between a UE 115 and a network entity 105, which may be examples of corresponding devices described with reference to FIGS. 1 and 2. The paging diagrams 300 may include examples of paging allocation schemes 305 (e.g., a paging allocation scheme 305-a, a paging allocation scheme 305-b, and a paging allocation scheme 305-b), which may be examples of a paging allocation scheme 220 described with reference to FIG. 2.

In some examples, the paging allocation schemes 305 may illustrate examples of a distribution of paging frames 310 and POs 315 within a DRX cycle 320 (e.g., a DRX cycle of a UE 115) and a paging cycle 325. For example, the paging frames 310 may be configured, according to the paging allocation scheme 305, to align with one or more radio frames within the paging cycle 325. In some examples, the DRX cycle 320 and the paging cycle 325 may align, in a time domain, according to a paging offset value indicated by a set of paging parameters (e.g., the paging parameters 210 or the updated paging parameters 230 described with reference to FIG. 2). In the examples illustrated by the paging allocation schemes 305, the paging offset value may be equal to one radio frame such that a first paging frame 310 occurs one radio frame after a first radio frame of the DRX cycle 320.

The paging allocation scheme 305-*a* illustrates a first example of a distribution of paging frames 310 and POs 315 within the DRX cycle 320 and the paging cycle 325. In some cases, the paging allocation scheme 305-*a* may be an example of the paging allocation scheme 220-*a* described with reference to FIG. 2, where POs 315 may occur within paging frames 310 that are distributed (e.g., uniformly) across non-contiguous radio frames of the paging cycle 325. In the example illustrated by the paging allocation scheme 305-*a*, the set of paging parameters may indicate four paging frames 310

$$\left( \text{e.g., } N = \frac{T}{4} \right)$$

and four POs 315 during each paging frame 310 (e.g., $N_s$=4), and the network entity 105 may transmit paging transmissions via respective sets of POs 315 during respective paging frames 310 across the paging cycle 325. In some cases, the UE 115 may identify a paging frame 310 and a PO 315 to monitor within the paging frame 310 according to the paging parameters and an ID of the UE 115 (e.g., as described with reference to FIG. 2). In some examples, the network entity 105 may configure the UE 115 to monitor POs 315 according to the paging allocation scheme 305-*a* based on capabilities associated with the UE 115 (e.g., the UE 115 may use the paging allocation scheme 305-*a* if the UE 115 supports relatively low capabilities). However, such a paging scheme may result in the network entity 105 remaining active during a relatively large portion of the paging cycle 325 (e.g., instead of entering an NES mode), which may increase power expenditure at the network entity 105.

The paging allocation scheme 305-*b* illustrates a second example of a distribution of paging frames 310 and POs 315 within the DRX cycle 320 and the paging cycle 325. In some examples, the paging allocation scheme 305-*b* may be an example of the paging allocation scheme 220-*b* described with reference to FIG. 2, where POs 315 may occur within a contiguous set of radio frames corresponding to a set of paging frames 310. In the example illustrated by the paging allocation scheme 305-*b*, the set of paging parameters may indicate four paging frames 310 and four POs 315 during each paging frame 310, and the network entity 105 may transmit paging transmissions via respective sets of POs 315 during respective paging frames 310 across a contiguous set of radio frames. For example, the four paging frames 310 indicated by the set of paging parameters may correspond to a first four consecutive radio frames of the paging cycle 325 and may each include a respective set of four POs 315 (e.g., the POs 315 may not occur consecutively in the time domain).

In some cases, the UE 115 may identify a paging frame 310 and a PO 315 to monitor within the paging frame 310 according to the paging parameters and an ID of the UE 115 (e.g., as described with reference to FIG. 2). In some examples, the network entity 105 may configure the UE 115 to monitor POs 315 according to the paging allocation scheme 305-*b* based on capabilities associated with the UE 115 (e.g., the UE 115 may use the paging allocation scheme 305-*b* if the UE 115 supports relatively higher capabilities). In some cases, consolidating the paging frames 310 and the POs 315 to occur during consecutive radio frames of the paging cycle 325 may reduce a power expenditure at the network entity 105 (e.g., enabling the network entity 105 to enter an NES mode while still communicating paging transmissions). Although paging allocation scheme 305-*b* generally illustrates contiguous radio frames, in some cases paging allocation scheme 305-*b* may use a condensed allocation of POs that may be non-contiguous but condensed within a region of the paging cycle. For example, the POs may occur during radio frames condensed within a region encompassing half, one-third, one-quarter, or some other fraction of radio frames of the paging cycle.

The paging allocation scheme 305-*c* illustrates a third example of a distribution of paging frames 310 and POs 315 within the DRX cycle 320 and the paging cycle 325. In some examples, the paging allocation scheme 305-*c* may be an example of the paging allocation scheme 220-*b* described with reference to FIG. 2, where POs 315 may occur within a contiguous set of radio frames corresponding to a paging frame 310. In the example illustrated by the paging allocation scheme 305-*c*, the set of paging parameters may indicate one paging frame 310 and sixteen POs 315 during the paging frame 310 (e.g., each PO 315 configured to occur during the paging cycle 325 may be associated with the same paging frame 310 and may occur consecutively in the time domain). For example, the paging frame 310 may indicate a starting time domain location for communicating the POs 315, which may align with an initial radio frame of the paging cycle 325 (e.g., offset from the DRX cycle 320 by a paging offset value).

In some examples, the POs 315 may occur during a contiguous set of radio frames including the initial radio frame and one or more additional radio frames 330 (e.g., a contiguous set of one or more radio frames subsequent to the initial radio frame). For example, each PO 315 may occupy one or more slots of a radio frame, and the POs 315 configured to occur during the paging frame 310 may extend beyond the initial radio frame indicated by the paging frame 310 into the one or more additional radio frames 330. In such examples, the UE 115 may monitor a PO 315 during the initial radio frame or one of the additional radio frames 330 according to the paging parameters and an ID of the UE 115 (e.g., as described with reference to FIG. 2). In some examples, the network entity 105 may configure the UE 115 to monitor POs 315 according to the paging allocation scheme 305-*c* based on capabilities associated with the UE 115 (e.g., the UE 115 may use the paging allocation scheme 305-*c* if the UE 115 supports relatively high capabilities). In some cases, consolidating the POs 315 to occur during consecutive radio frames (e.g., associated with a single paging frame 310) of the DRX cycle 320 and the paging cycle 325 may reduce a power expenditure at the network entity 105 (e.g., enabling the network entity 105 to enter an NES mode while still communicating paging transmissions).

Figure 4:
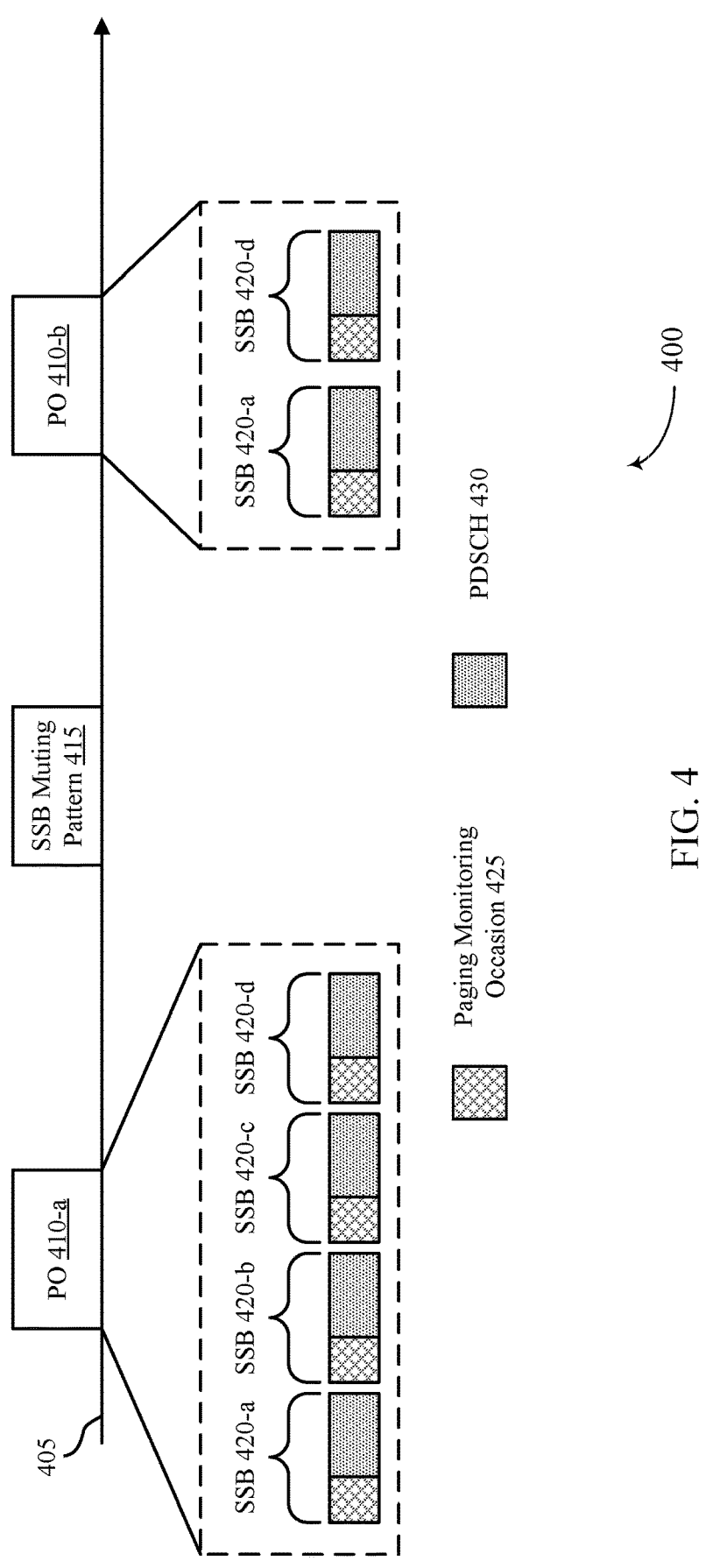
FIG. 4 shows an example of a paging occasion (PO) monitoring scheme that supports configurable paging schemes for wireless communications in accordance with one or more aspects of the present disclosure.

FIG. 4 shows an example of a PO monitoring scheme 400 that supports configurable paging schemes for wireless communications in accordance with one or more aspects of the present disclosure. The PO monitoring scheme 400 may implement, or be implemented by, one or more aspects of the wireless communications systems 100 and 200, as well as the paging diagrams 300. For example, the PO monitoring scheme 400 illustrates an example of a signaling timeline 405 for a UE 115 to monitor one or more POs 410 to receive paging transmissions from a network entity 105, which may be examples of corresponding devices and aspects described with reference to FIGS. 1-3. In some examples, the POs 410 may be distributed to one or more radio frames of a DRX cycle of the UE 115 according to a paging allocation scheme, which may be an example of corresponding aspects described with reference to FIGS. 2 and 3. In some cases, the PO monitoring scheme 400 may support the UE 115 updating a SSB muting pattern for monitoring a PO 410 according to an indication of a muting pattern 415.

In some cases, the UE 115 may monitor a PO 410-a according to the signaling timeline 405. For example, the UE 115 may identify the PO 410-a to monitor from a set of POs 410 according to a set of paging parameters and an ID of the UE 115 (e.g., as described with reference to FIG. 2). In some cases, the PO 410-a may include a set of SSBs 420, such as a SSB 420-a (e.g., SSB0), a SSB 420-b (e.g., SSB1), a SSB 420-c (e.g., SSB2), and a SSB 420-d (e.g., SSB3). Each SSB 420 may occupy a slot of a radio frame and may include a respective PDCCH monitoring occasion (PMO) 425 and a corresponding PDSCH 430. In some cases, the PMO 425 may be associated with an index of an SSB 420 communicated during a PO 410. For example, during the PO 410-a, the UE 115 may identify a first PMO 425 in the SSB 420-a (e.g., PMO0), a second PMO 425 in the SSB 420-b (e.g., PMO1), a third PMO 425 in the SSB 420-c (e.g., PMO2), and a fourth PMO 425 in the SSB 420-d (e.g., PMO3). The UE 115 may monitor a PDCCH corresponding to each SSB 420 to receive a paging transmission from the network entity 105, as well as a corresponding PDSCH 430. Additionally, or alternatively, one or more other UEs 115 may be configured to monitor SSBs 420 within the PO 410-a. In some other examples, the one or more other UEs 115 may monitor SSBs 420 within a different PO 410 of a set of POs 410 that includes the PO 410-a.

In some examples, the UE 115 may receive signaling indicating which SSBs 420 will be communicated during a PO 410. For example, the UE 115 may identify a SSB bitmap (e.g., ssb-PositionsInBurst) in control signaling received from the network entity 105, such as in a SIB1 included in an RRC message (e.g., communicated when the UE 115 associates with the network entity 105). In some cases, the SSB bitmap may include a set of bits corresponding to respective SSBs 420, where a binary value of each bit may indicate whether a corresponding SSB 420 will be communicated during a PO 410. As an example, the UE 115 may monitor the PO 410-a according to a SSB bitmap communicated via SIB1 indicating that each of the SSB 420-a, the SSB 420-b, the SSB 420-c, and the SSB 420-d will be communicated during the PO 410-a (e.g., a bitmap indicating [1 1 1 1]). In some cases, a quantity of SSBs 420 communicated during a PO 410 may be associated with a duration of the PO 410 (e.g., due to each SSB 420 occupying a slot of a radio frame). In some examples, however, communicating each SSB 420 during a PO 410 may result in the PO 410 occupying a relatively large amount of slots during a radio frame (e.g., if the UE 115 is capable of receiving a paging transmission while receiving a smaller quantity of SSBs 420).

In some cases, the network entity 105 may transmit a SSB muting pattern 415 to the UE 115. The SSB muting pattern 415 may indicate an updated SSB bitmap which may replace a previously configured SSB bitmap (e.g., overwriting the SSB bitmap indicated in SIB1). In some examples, the UE 115 may identify the updated SSB bitmap and may monitor a subsequent PO 410 (e.g., the PO 410-b) in accordance with the updated SSB bitmap. In the example illustrated by the PO monitoring scheme 400, the updated SSB bitmap may indicate to mute the SSB 420-b and the SSB 420-c (e.g., a bitmap indicating [1 0 0 1] to mute SSB1 and SSB2). In some cases, the network entity 105 may transmit the SSB muting pattern 415 via dynamic signaling (e.g., instead of via SIB1 or another RRC layer parameter). For example, the network entity 105 may include the SSB muting pattern in a set of updated paging parameters, such as the set of updated paging parameters 230 described with reference to FIG. 2, which may be communicated via a DCI message (or a transmission scheduled by the DCI message).

In some examples, the UE 115 may monitor the PO 410-b according to the SSB muting pattern 415. For example, the UE 115 may monitor the SSB 420-a (e.g., SSB0) and the SSB 420-d (e.g., SSB3) during the PO 410-b based on the SSB muting pattern 415 indicating to mute the SSB 420-b (e.g., SSB1) and the SSB 420-c (e.g., SSB2). In some cases, such a SSB muting pattern may reduce a duration associated with the PO 410-b, which may reduce latency associated with communicating paging transmissions to the UE 115. Additionally, communicating the SSB muting pattern 415 via dynamic signaling may enable the network entity 105 to update the SSB muting pattern without waiting for a subsequent SI message transmission (which may occur relatively infrequently).

Figure 5:
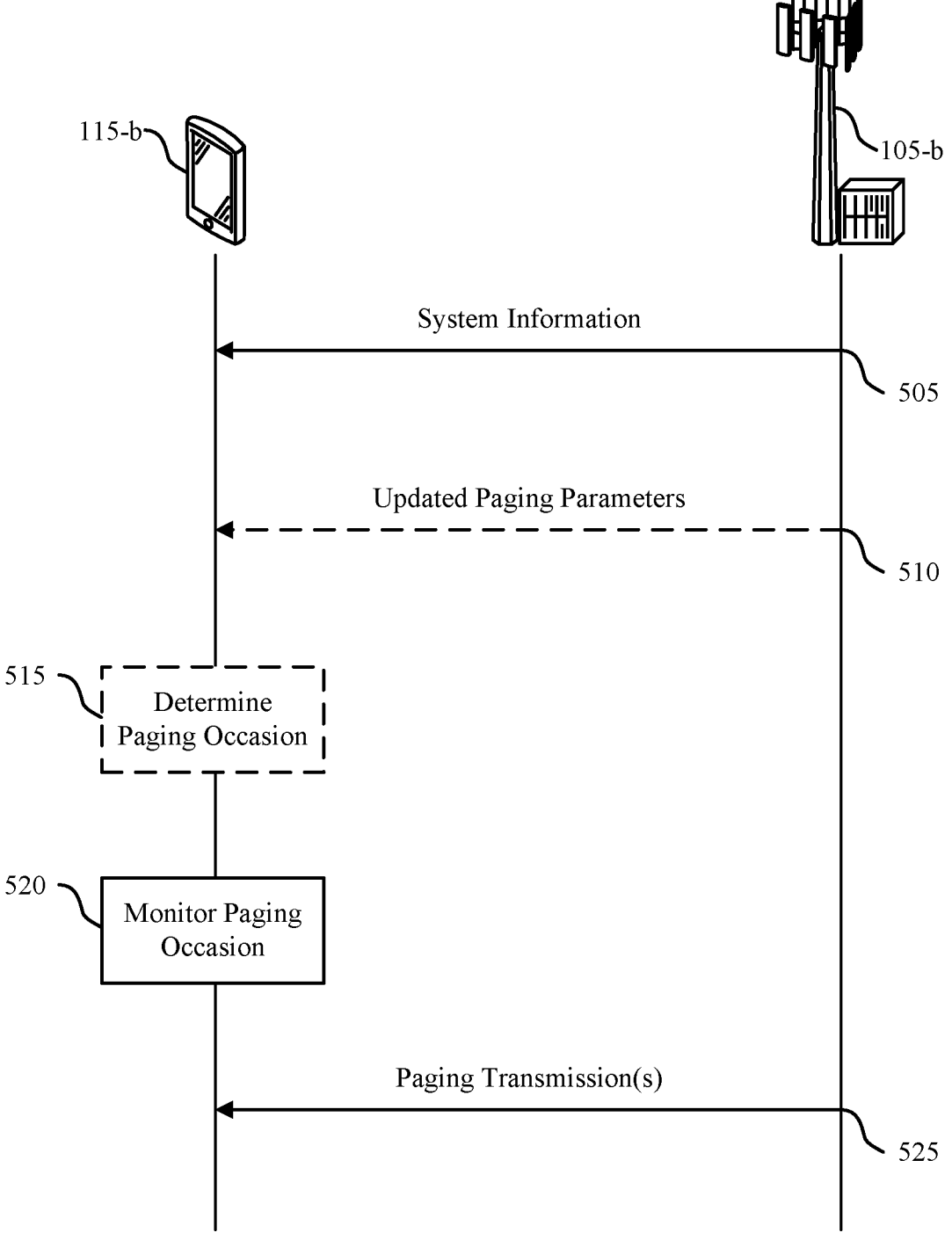
FIG. 5 shows an example of a process flow that supports configurable paging schemes for wireless communications in accordance with one or more aspects of the present disclosure.

FIG. 5 shows an example of a process flow 500 that supports configurable paging schemes for wireless communications in accordance with one or more aspects of the present disclosure. The process flow 500 may implement, or be implemented by, one or more aspects of the wireless communications systems 100 and 200, the paging diagrams 300, and the PO monitoring scheme 400. For example, the process flow 500 illustrates signaling between a UE 115-b and a network entity 105-b, which may be examples of corresponding devices described with reference to FIGS. 1-4. In some cases, the process flow 500 may support the network entity 105-b configuring a paging allocation scheme for the UE 115-b to monitor for one or more POs, which may be examples of corresponding aspects described with reference to FIGS. 2-4. Alternative examples of the following may be implemented, where some processes are performed in a different order than described or are not performed. In some cases, processes may include additional features not mentioned below, or further processes may be added.

At 505, the network entity 105-b may transmit a SI message to the UE 115-b. In some cases, the SI message may include a set of paging parameters and may include an indication of whether the UE 115-b is to use a first paging allocation scheme or a second paging allocation scheme for monitoring one or more POs during a DRX cycle of the UE 115-b. The first paging allocation scheme may include multiple POs distributed across multiple radio frames during the DRX cycle, where at least two of the radio frames may be non-contiguous (e.g., in time). The second paging allocation scheme may include multiple POs distributed across multiple contiguous radio frames during the DRX cycle. In some examples, the set of paging parameters may include a quantity of paging frames included during the DRX cycle, a quantity of POs included in each paging frame, a duration corresponding to a paging cycle, a paging frame offset value (e.g., indicating a time domain alignment between the paging cycle and the DRX cycle), an indication of an initial PDCCH monitoring occasion within a PO, or any combination thereof.

In some examples, a starting time domain location of the multiple contiguous radio frames may be based on a start of the DRX cycle and the paging frame offset value. In some examples, the set of paging parameters may indicate multiple paging frames, where each paging frame may be associated with a respective subset of the multiple POs and the multiple contiguous radio frames may include the multiple paging frames. In some other examples, the set of paging parameters may indicate a single paging frame associated with the multiple POs, where an initial radio frame of the multiple contiguous radio frames may align, in the time domain, with the single paging frame.

At 510, the network entity 105-*b* may transmit a set of updated paging parameters to the UE 115-*b*. For example, the set of updated paging parameters may include a second set of paging parameters replacing one or more of the paging parameters indicted in the SI message. In some cases, the network entity 105-*b* may transmit the updated paging parameters via a DCI message (e.g., dynamic signaling). For example, the DCI message may include a paging DCI message, a DCI message scheduling a paging message that includes the second set of paging parameters, a DCI message including a paging early indication, a DCI message communicated via a CSS, or any combination thereof. In some examples, the DCI message may indicate a SSB muting pattern for a first PO, where the SSB muting pattern may indicate to mute one or more SSBs of a set of multiple SSBs associated with the first PO.

At 515, the UE 115-*b* may determine a first PO to monitor in accordance with the first paging allocation scheme. For example, the UE 115-*b* may determine a time domain location of a first radio frame including the first PO based on the set of paging parameters indicating a first paging frame, where the first paging frame may indicate a starting radio frame associated with a set of POs including the first PO. In some examples, the starting radio frame may be the first radio frame. In some other examples, the starting radio frame may be a second radio frame that occurs prior to the first radio frame (e.g., if POs extend into a subsequent radio frame). Additionally, or alternatively, the UE 115-*b* may determine a time domain location of the first PO within the multiple POs based on an ID of the UE 115-*b* (e.g., as described with reference to FIG. 2).

At 520, the UE 115-*b* may monitor a PO in accordance with the set of paging parameters and the first paging allocation scheme or the second paging allocation scheme. For example, the UE 115-*b* may monitor the first PO determined by the UE 115-*b* in accordance with the paging parameters, the ID of the UE 115-*b*, and the indicated paging allocation scheme.

At 525, the network entity 105-*b* may transmit one or more paging transmissions to the UE 115-*b*. For example, the UE 115-*b* may receive the one or more paging transmissions during the first PO based on the UE 115-*b* monitoring the first PO.

In some cases, flexibly configuring a paging allocation scheme may support reduced power expenditure at the network entity 105-*b* (e.g., enabling the network entity 105-*b* to enter an NES mode while still communicating the paging transmissions).

Figure 6:
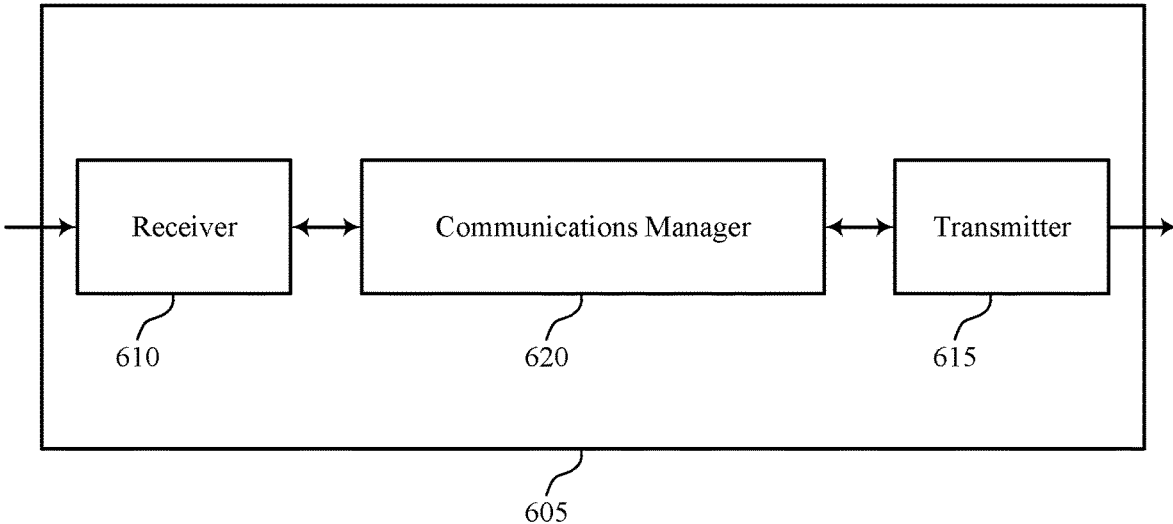
FIGS. 6 and 7 show block diagrams of devices that support configurable paging schemes for wireless communications in accordance with one or more aspects of the present disclosure.
Figure 6:

FIG. 6 shows a block diagram 600 of a device 605 that supports configurable paging schemes for wireless communications in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to configurable paging schemes for wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to configurable paging schemes for wireless communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations or components thereof may be examples of means for performing various aspects of configurable paging schemes for wireless communications as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving system information including a set of paging parameters and an indication of whether the UE is to use a first paging allocation scheme or a second paging allocation scheme for monitoring one or more POs during a DRX cycle of the UE, where: the first paging allocation scheme includes a set of multiple POs distributed across a set of multiple radio frames during the DRX cycle, where at least two of the set of multiple radio frames are non-contiguous; and the second paging allocation scheme includes the set of multiple POs distributed across a set of multiple contiguous radio frames during the DRX cycle. The communications manager 620 is capable of, configured to, or operable to support a means for monitoring, in accordance with the set of paging parameters and the first paging allocation scheme or the second paging allocation scheme, a first PO of the set of multiple POs based on an ID associated with the UE and receiving the system information.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced power expenditure and reduced latency associated with communicating paging transmissions.

Figure 7:
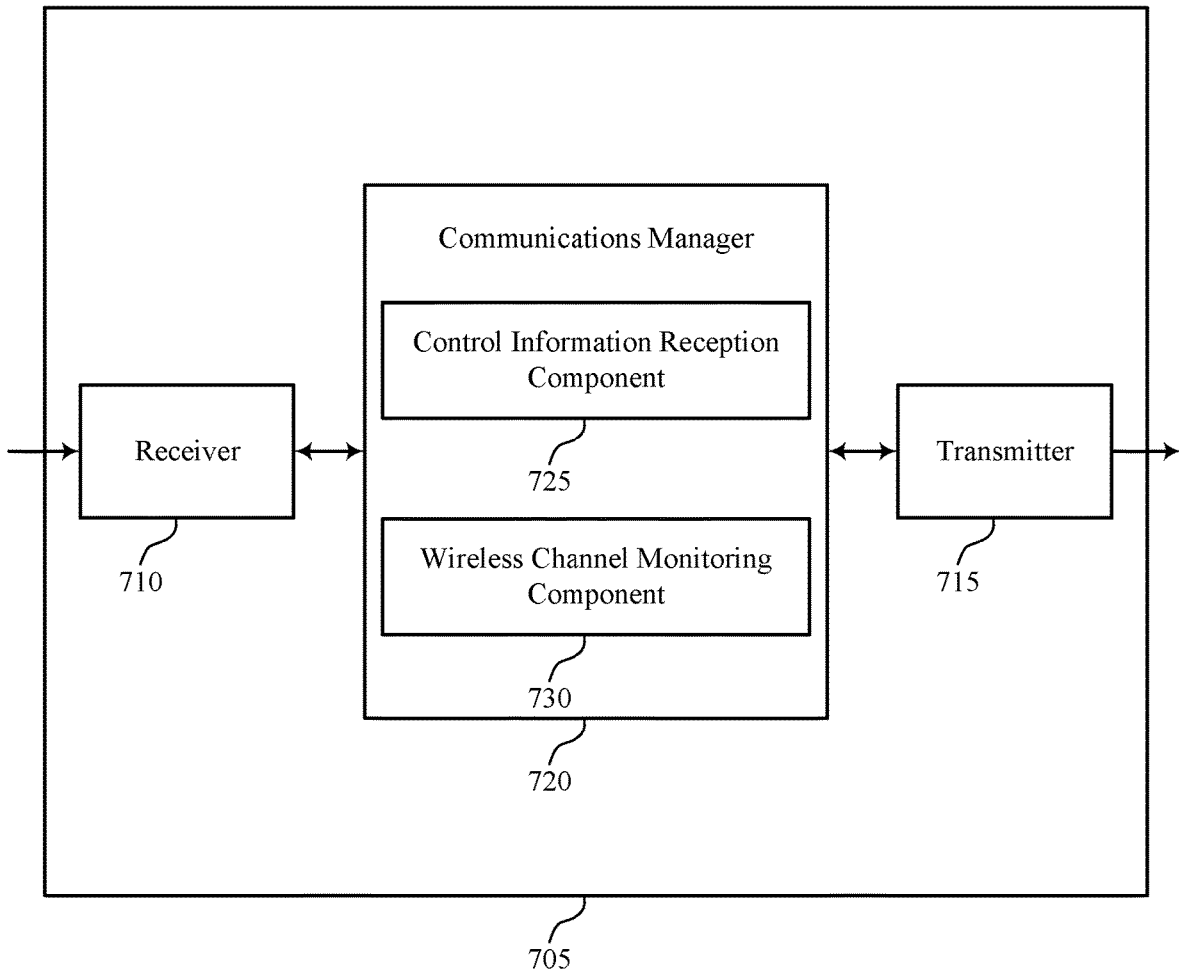

FIG. 7 shows a block diagram 700 of a device 705 that supports configurable paging schemes for wireless communications in accordance with one or more aspects of the present disclosure. The device 705 may be an example of aspects of a device 605 or a UE 115 as described herein. The device 705 may include a receiver 710, a transmitter 715, and a communications manager 720. The device 705, or one of more components of the device 705 (e.g., the receiver 710, the transmitter 715, the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to configurable paging schemes for wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to configurable paging schemes for wireless communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of configurable paging schemes for wireless communications as described herein. For example, the communications manager 720 may include a control information reception component 725 a wireless channel monitoring component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The control information reception component 725 is capable of, configured to, or operable to support a means for receiving system information including a set of paging parameters and an indication of whether the UE is to use a first paging allocation scheme or a second paging allocation scheme for monitoring one or more POs during a DRX cycle of the UE, where: the first paging allocation scheme includes a set of multiple POs distributed across a set of multiple radio frames during the DRX cycle, where at least two of the set of multiple radio frames are non-contiguous; and the second paging allocation scheme includes the set of multiple POs distributed across a set of multiple contiguous radio frames during the DRX cycle. The wireless channel monitoring component 730 is capable of, configured to, or operable to support a means for monitoring, in accordance with the set of paging parameters and the first paging allocation scheme or the second paging allocation scheme, a first PO of the set of multiple POs based on an ID associated with the UE and receiving the system information.

Figure 8:
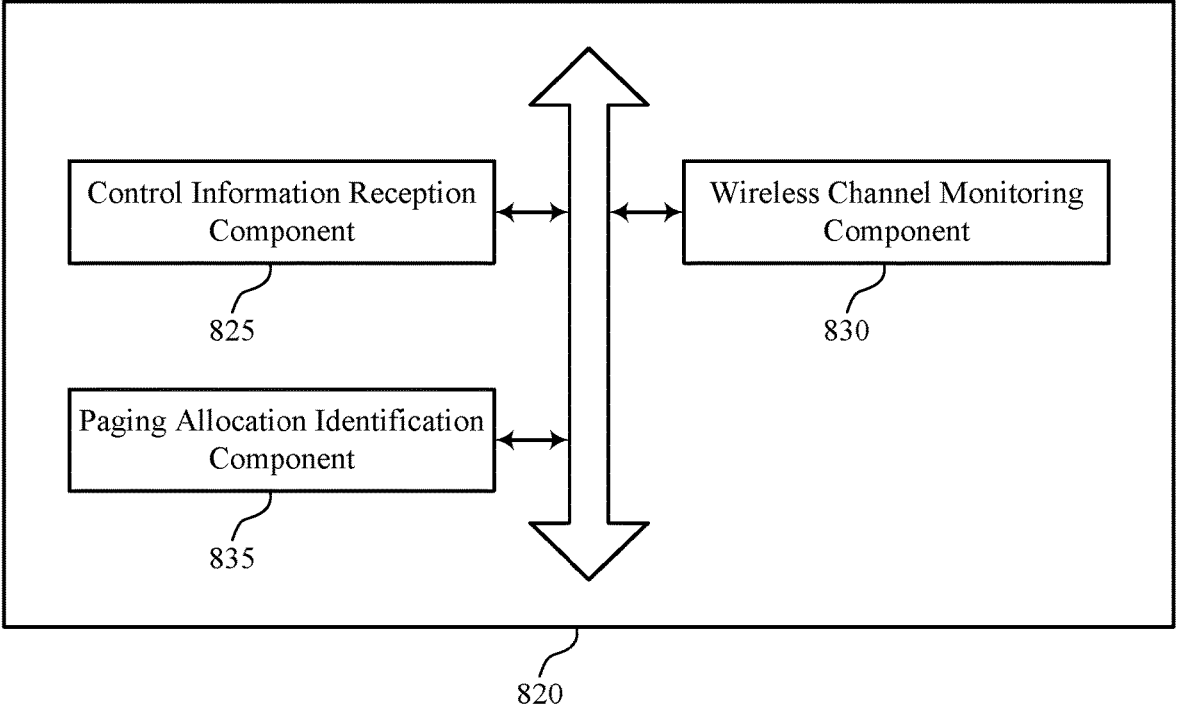
FIG. 8 shows a block diagram of a communications manager that supports configurable paging schemes for wireless communications in accordance with one or more aspects of the present disclosure.

FIG. 8 shows a block diagram 800 of a communications manager 820 that supports configurable paging schemes for wireless communications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of configurable paging schemes for wireless communications as described herein. For example, the communications manager 820 may include a control information reception component 825, a wireless channel monitoring component 830, a paging allocation identification component 835, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The control information reception component 825 is capable of, configured to, or operable to support a means for receiving system information including a set of paging parameters and an indication of whether the UE is to use a first paging allocation scheme or a second paging allocation scheme for monitoring one or more POs during a DRX cycle of the UE, where: the first paging allocation scheme includes a set of multiple POs distributed across a set of multiple radio frames during the DRX cycle, where at least two of the set of multiple radio frames are non-contiguous; and the second paging allocation scheme includes the set of multiple POs distributed across a set of multiple contiguous radio frames during the DRX cycle. The wireless channel monitoring component 830 is capable of, configured to, or operable to support a means for monitoring, in accordance with the set of paging parameters and the first paging allocation scheme or the second paging allocation scheme, a first PO of the set of multiple POs based on an ID associated with the UE and receiving the system information.

In some examples, the set of paging parameters indicates a set of multiple paging frames, each paging frame of the set of multiple paging frames associated with a respective subset of POs of the set of multiple POs; and the set of multiple contiguous radio frames include the set of multiple paging frames.

In some examples, the set of paging parameters indicates a single paging frame that is associated with the set of multiple POs; and an initial radio frame of the set of multiple contiguous radio frames aligns, in a time domain, with the single paging frame.

In some examples, the control information reception component 825 is capable of, configured to, or operable to support a means for receiving a DCI message indicating a second set of paging parameters, where the second set of paging parameters includes one or more updated paging parameters for the UE to use for monitoring the one or more POs.

In some examples, the DCI message includes a paging DCI message, a DCI message that schedules a paging message that includes the second set of paging parameters, a DCI message including a paging early indication, a DCI message communicated via a common search space, or any combination thereof.

In some examples, the paging allocation identification component 835 is capable of, configured to, or operable to support a means for determining a time domain location of the first PO within the set of multiple POs based on the ID associated with the UE, where monitoring the first PO is based on determining the time domain location of the first PO.

In some examples, a starting time domain location of the set of multiple contiguous radio frames is based on a start of the DRX cycle and a paging frame offset value. In some examples, the paging frame offset value is indicated by the set of paging parameters.

In some examples, the control information reception component 825 is capable of, configured to, or operable to support a means for receiving a DCI message indicating a SSB muting pattern for the first PO, where the SSB muting pattern indicates to mute one or more SSBs of a set of multiple SSBs associated with the first PO.

In some examples, the paging allocation identification component 835 is capable of, configured to, or operable to support a means for determining a time domain location of a first radio frame including the first PO based on the set of paging parameters indicating a first paging frame, where the first paging frame indicates a starting radio frame associated with a set of POs including the first PO.

In some examples, the starting radio frame is the first radio frame; or the starting radio frame is a second radio frame that occurs prior to the first radio frame.

In some examples, the set of paging parameters includes a quantity of paging frames included during the DRX cycle, a quantity of POs included in each paging frame of the quantity of paging frames, a duration corresponding to a paging cycle, an indication of an initial PMO within a PO, or any combination thereof.

Figure 9:
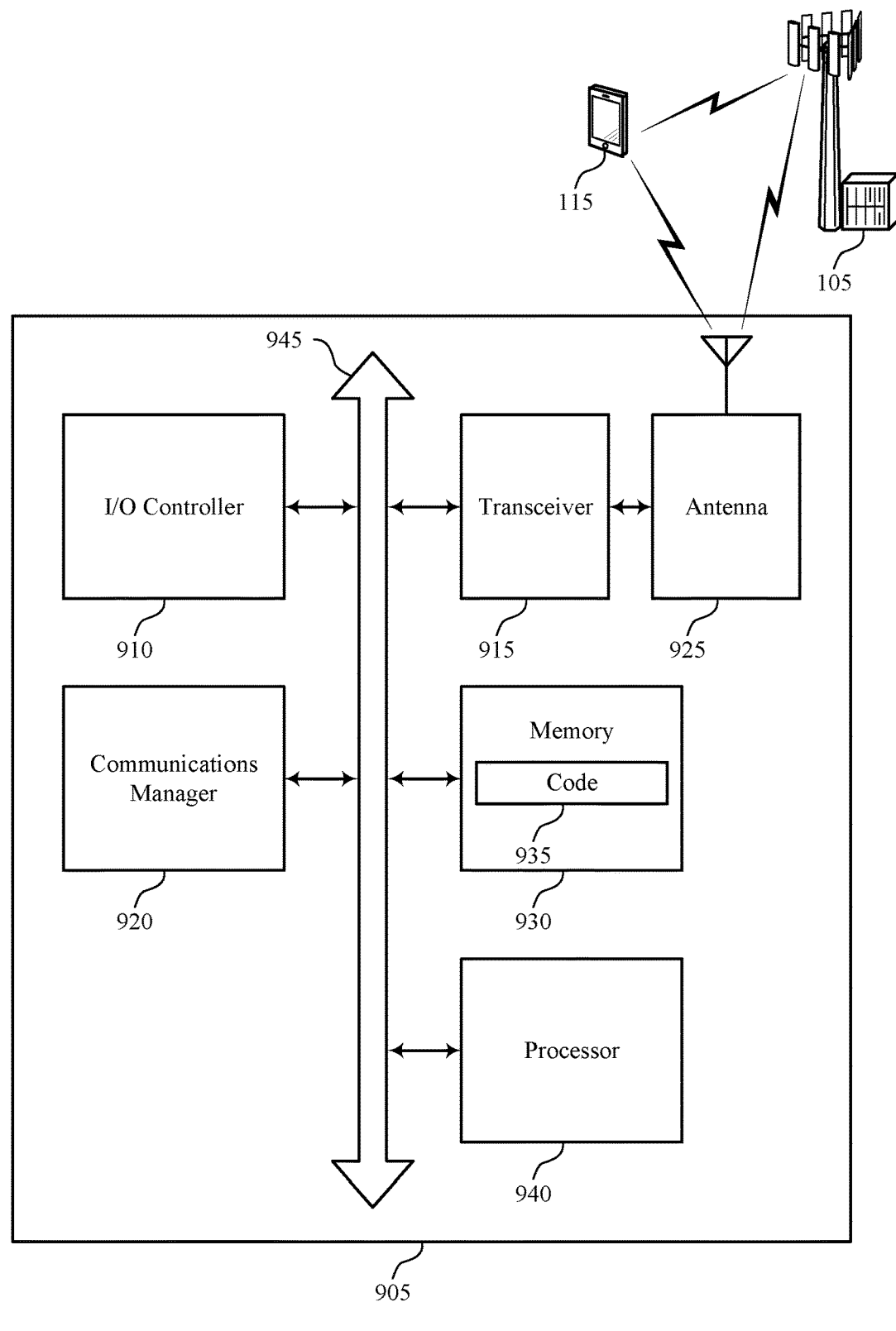
FIG. 9 shows a diagram of a system including a device that supports configurable paging schemes for wireless communications in accordance with one or more aspects of the present disclosure.

FIG. 9 shows a diagram of a system 900 including a device 905 that supports configurable paging schemes for wireless communications in accordance with one or more aspects of the present disclosure. The device 905 may be an example of or include components of a device 605, a device 705, or a UE 115 as described herein. The device 905 may communicate (e.g., wirelessly) with one or more other devices (e.g., network entities 105, UEs 115, or a combination thereof). The device 905 may include components for bi-directional voice and data communications including components for transmitting and receiving communications, such as a communications manager 920, an input/output (I/O) controller, such as an I/O controller 910, a transceiver 915, one or more antennas 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna. However, in some other cases, the device 905 may have more than one antenna, which may be capable of concurrently transmitting or receiving multiple wireless transmissions. The transceiver 915 may communicate bi-directionally via the one or more antennas 925 using wired or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable, or processor-executable code, such as the code 935. The code 935 may include instructions that, when executed by the at least one processor 940, cause the device

905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may include, among other things, a basic I/O system (BIOS) which may control basic hardware or software operation such as the interaction with peripheral components or devices.

The at least one processor 940 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting configurable paging schemes for wireless communications). For example, the device 905 or a component of the device 905 may include at least one processor 940 and at least one memory 930 coupled with or to the at least one processor 940, the at least one processor 940 and the at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions described herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code 935 (e.g., processor-executable code) stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for receiving system information including a set of paging parameters and an indication of whether the UE is to use a first paging allocation scheme or a second paging allocation scheme for monitoring one or more POs during a DRX cycle of the UE, where: the first paging allocation scheme includes a set of multiple POs distributed across a set of multiple radio frames during the DRX cycle, where at least two of the set of multiple radio frames are non-contiguous; and the second paging allocation scheme includes the set of multiple POs distributed across a set of multiple contiguous radio frames during the DRX cycle. The communications manager 920 is capable of, configured to, or operable to support a means for monitoring, in accordance with the set of paging parameters and the first paging allocation scheme or the second paging allocation scheme, a first PO of the set of multiple POs based on an ID associated with the UE and receiving the system information.

By including or configuring the communications manager 920 in accordance with examples as described herein, the device 905 may support techniques for reduced power expenditure and reduced latency associated with communicating paging transmissions.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of configurable paging schemes for wireless communications as described herein, or the at least one processor 940 and the at least one memory 930 may be otherwise configured to, individually or collectively, perform or support such operations.

Figure 10:
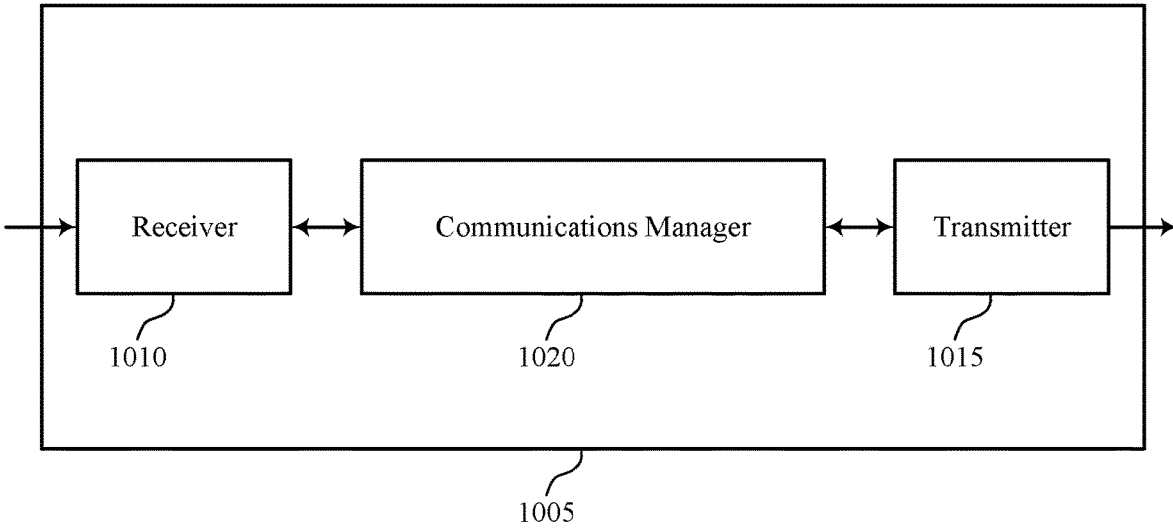
FIGS. 10 and 11 show block diagrams of devices that support configurable paging schemes for wireless communications in accordance with one or more aspects of the present disclosure.

FIG. 10 shows a block diagram 1000 of a device 1005 that supports configurable paging schemes for wireless communications in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations or components thereof may be examples of means for performing various aspects of configurable paging schemes for wireless communications as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor (e.g., referred to as a processor-executable code). If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for outputting system information including a set of paging parameters and an indication of whether a set of multiple POs are allocated according to a first paging allocation scheme or a second paging allocation scheme during a DRX cycle, where: the first paging allocation scheme includes the set of multiple POs being distributed across a set of multiple radio frames during the DRX cycle, where at least two of the set of multiple radio frames are non-contiguous; and the second paging allocation scheme includes the set of multiple POs being distributed across a set of multiple contiguous radio frames during the DRX cycle. The communications manager 1020 is capable of, configured to, or operable to support a means for outputting, in accordance with the set of paging parameters and the first paging allocation scheme or the second paging allocation scheme, one or more paging transmissions to one or more UEs during corresponding POs of the set of multiple POs, the corresponding POs being based on respective IDs associated with the one or more UEs.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced power expenditure and reduced latency associated with communicating paging transmissions.

Figure 11:
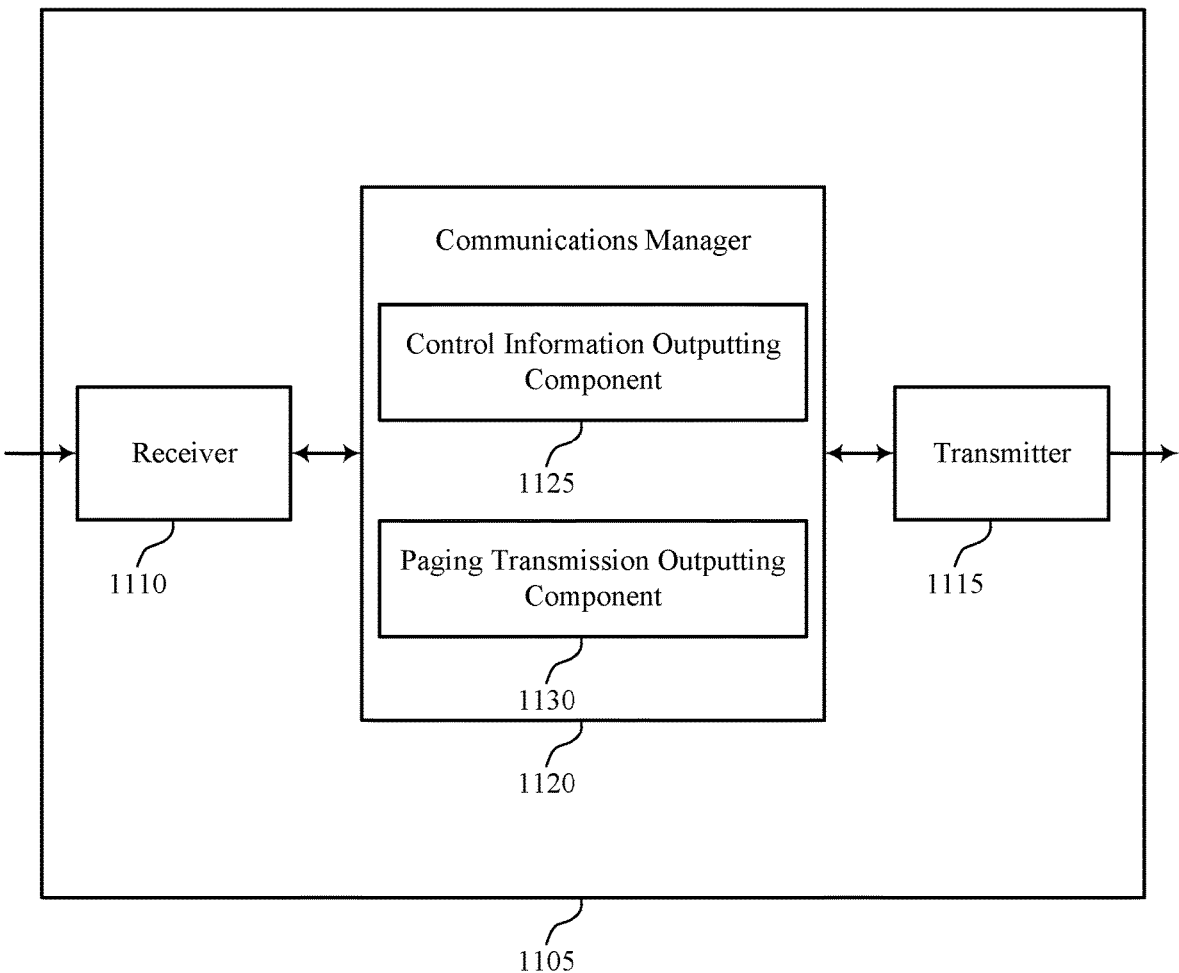

FIG. 11 shows a block diagram 1100 of a device 1105 that supports configurable paging schemes for wireless communications in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one of more components of the device 1105 (e.g., the receiver 1110, the transmitter 1115, the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of configurable paging schemes for wireless communications as described herein. For example, the communications manager 1120 may include a control information outputting component 1125 a paging transmission outputting component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The control information outputting component 1125 is capable of, configured to, or operable to support a means for outputting system information including a set of paging parameters and an indication of whether a set of multiple POs are allocated according to a first paging allocation scheme or a second paging allocation scheme during a DRX cycle, where: the first paging allocation scheme includes the set of multiple POs being distributed across a set of multiple radio frames during the DRX cycle, where at least two of the set of multiple radio frames are non-contiguous; and the second paging allocation scheme includes the set of multiple POs being distributed across a set of multiple contiguous radio frames during the DRX cycle. The paging transmission outputting component 1130 is capable of, configured to, or operable to support a means for outputting, in accordance with the set of paging parameters and the first paging allocation scheme or the second paging allocation scheme, one or more paging transmissions to one or more UEs during corresponding POs of the set of multiple POs, the corresponding POs being based on respective IDs associated with the one or more UEs.

Figure 12:
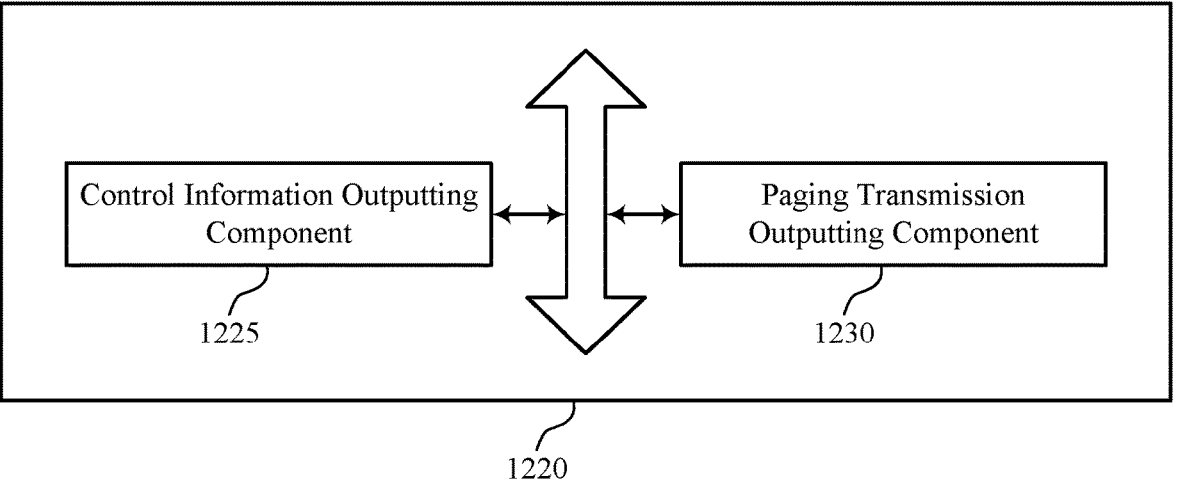
FIG. 12 shows a block diagram of a communications manager that supports configurable paging schemes for wireless communications in accordance with one or more aspects of the present disclosure.

FIG. 12 shows a block diagram 1200 of a communications manager 1220 that supports configurable paging schemes for wireless communications in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of configurable paging schemes for wireless communications as described herein. For example, the communications manager 1220 may include a control information outputting component 1225 a paging transmission outputting component 1230, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The control information outputting component 1225 is capable of, configured to, or operable to support a means for outputting system information including a set of paging parameters and an indication of whether a set of multiple POs are allocated according to a first paging allocation scheme or a second paging allocation scheme during a DRX cycle, where: the first paging allocation scheme includes the set of multiple POs being distributed across a set of multiple radio frames during the DRX cycle, where at least two of the set of multiple radio frames are non-contiguous; and the second paging allocation scheme includes the set of multiple POs being distributed across a set of multiple contiguous radio frames during the DRX cycle. The paging transmission outputting component 1230 is capable of, configured to, or operable to support a means for outputting, in accordance with the set of paging parameters and the first paging allocation scheme or the second paging allocation scheme, one or more paging transmissions to one or more UEs during corresponding POs of the set of multiple POs, the corresponding POs being based on respective IDs associated with the one or more UEs.

In some examples, the set of paging parameters indicates a set of multiple paging frames, each paging frame of the set of multiple paging frames associated with a respective subset of POs of the set of multiple POs; and the set of multiple contiguous radio frames include the set of multiple paging frames.

In some examples, the set of paging parameters indicates a single paging frame that is associated with the set of multiple POs; and an initial radio frame of the set of multiple contiguous radio frames aligns, in a time domain, with the single paging frame.

In some examples, the control information outputting component 1225 is capable of, configured to, or operable to support a means for outputting a DCI message indicating a second set of paging parameters, where the second set of paging parameters includes one or more updated paging parameters for the one or more UEs to use for monitoring the corresponding POs.

In some examples, the DCI message includes a paging DCI message, a DCI message that schedules a paging message that indicates the second set of paging parameters, a DCI message including a paging early indication, a DCI message communicated via a common search space, or any combination thereof.

In some examples, a starting time domain location of the set of multiple contiguous radio frames is based on a start of the DRX cycle and a paging frame offset value. In some examples, the paging frame offset value is indicated by the set of paging parameters.

In some examples, the control information outputting component 1225 is capable of, configured to, or operable to support a means for outputting a DCI message indicating a SSB muting pattern for the corresponding POs, where the SSB muting pattern indicates to mute one or more SSBs of a set of multiple SSBs associated with the corresponding POs.

In some examples, the set of paging parameters includes a quantity of paging frames included during the DRX cycle, a quantity of POs included in each paging frame of the quantity of paging frames, a duration corresponding to a paging cycle, an indication of an initial PMO within a PO, or any combination thereof.

Figure 13:
FIG. 13 shows a diagram of a system including a device that supports configurable paging schemes for wireless communications in accordance with one or more aspects of the present disclosure.

FIG. 13 shows a diagram of a system 1300 including a device 1305 that supports configurable paging schemes for wireless communications in accordance with one or more aspects of the present disclosure. The device 1305 may be an example of or include components of a device 1005, a device 1105, or a network entity 105 as described herein. The device 1305 may communicate with other network devices or network equipment such as one or more of the network entities 105, UEs 115, or any combination thereof. The communications may include communications over one or more wired interfaces, over one or more wireless interfaces, or any combination thereof. The device 1305 may include components that support outputting and obtaining communications, such as a communications manager 1320, a transceiver 1310, one or more antennas 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., communication link(s) 125, backhaul communication link(s) 120, a midhaul communication link 162, a fronthaul communication link 168).

The at least one memory 1325 may include RAM, ROM, or any combination thereof. The at least one memory 1325 may store computer-readable, computer-executable, or processor-executable code, such as the code 1330. The code 1330 may include instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may include, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting configurable paging schemes for wireless communications). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. For example, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with one or more other network devices 105, and may include a controller or scheduler for controlling communications with UEs 115 (e.g., in cooperation with the one or more other network devices). In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for outputting system information including a set of paging parameters and an indication of whether a set of multiple POs are allocated according to a first paging allocation scheme or a second paging allocation scheme during a DRX cycle, where: the first paging allocation scheme includes the set of multiple POs being distributed across a set of multiple radio frames during the DRX cycle, where at least two of the set of multiple radio frames are non-contiguous; and the second paging allocation scheme includes the set of multiple POs being distributed across a set of multiple contiguous radio frames during the DRX cycle. The communications manager 1320 is capable of, configured to, or operable to support a means for outputting, in accordance with the set of paging parameters and the first paging allocation scheme or the second paging allocation scheme, one or more paging transmissions to one or more UEs during corresponding POs of the set of multiple POs, the corresponding POs being based on respective IDs associated with the one or more UEs.

By including or configuring the communications manager 1320 in accordance with examples as described herein, the device 1305 may support techniques for reduced power expenditure and reduced latency associated with communicating paging transmissions.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of configurable paging schemes for wireless communications as described herein, or the at least one processor 1335 and the at least one memory 1325 may be otherwise configured to, individually or collectively, perform or support such operations.

FIG. 14 shows a flowchart illustrating a method 1400 that supports configurable paging schemes for wireless communications in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving system information including a set of paging parameters and an indication of whether the UE is to use a first paging allocation scheme or a second paging allocation scheme for monitoring one or more POs during a DRX cycle of the UE, where: the first paging allocation scheme includes a set of multiple POs distributed across a set of multiple radio frames during the DRX cycle, where at least two of the set of multiple radio frames are non-contiguous; and the second paging allocation scheme includes the set of multiple POs distributed across a set of multiple contiguous radio frames during the DRX cycle. The operations of 1405 may be performed in accordance with examples as disclosed herein. In some examples, aspects of the operations of 1405 may be performed by a control information reception component 825 as described with reference to FIG. 8.

At 1410, the method may include monitoring, in accordance with the set of paging parameters and the first paging allocation scheme or the second paging allocation scheme, a first PO of the set of multiple POs based on an ID associated with the UE and receiving the system information. The operations of 1410 may be performed in accordance with examples as disclosed herein. In some examples, aspects of the operations of 1410 may be performed by a wireless channel monitoring component 830 as described with reference to FIG. 8.

FIG. 15 shows a flowchart illustrating a method 1500 that supports configurable paging schemes for wireless communications in accordance with one or more aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include outputting system information including a set of paging parameters and an indication of whether a set of multiple POs are allocated according to a first paging allocation scheme or a second paging allocation scheme during a DRX cycle, where: the first paging allocation scheme includes the set of multiple POs being distributed across a set of multiple radio frames during the DRX cycle, where at least two of the set of multiple radio frames are non-contiguous; and the second paging allocation scheme includes the set of multiple POs being distributed across a set of multiple contiguous radio frames during the DRX cycle. The operations of 1505 may be performed in accordance with examples as disclosed herein. In some examples, aspects of the operations of 1505 may be performed by a control information outputting component 1225 as described with reference to FIG. 12.

At 1510, the method may include outputting, in accordance with the set of paging parameters and the first paging allocation scheme or the second paging allocation scheme, one or more paging transmissions to one or more UEs during corresponding POs of the set of multiple POs, the corresponding POs being based on respective IDs associated with the one or more UEs. The operations of 1510 may be performed in accordance with examples as disclosed herein. In some examples, aspects of the operations of 1510 may be performed by a paging transmission outputting component 1230 as described with reference to FIG. 12.

The following provides an overview of aspects of the present disclosure:

Aspect 1: A method for wireless communications by a UE, comprising: receiving system information comprising a set of paging parameters and an indication of whether the UE is to use a first paging allocation scheme or a second paging allocation scheme for monitoring one or more POs during a DRX cycle of the UE, wherein: the first paging allocation scheme comprises a plurality of POs distributed across a plurality of radio frames during the DRX cycle, wherein at least two of the plurality of radio frames are non-contiguous; and the second paging allocation scheme comprises the plurality of POs distributed across a plurality of contiguous radio frames during the DRX cycle; and monitoring, in accordance with the set of paging parameters and the first paging allocation scheme or the second paging allocation scheme, a first PO of the plurality of POs based at least in part on an ID associated with the UE and receiving the system information.

Aspect 2: The method of aspect 1, wherein the system information indicates that the UE is to use the second paging allocation scheme, and wherein the set of paging parameters indicates a plurality of paging frames, each paging frame of the plurality of paging frames associated with a respective subset of POs of the plurality of POs; and the plurality of contiguous radio frames comprise the plurality of paging frames.

Aspect 3: The method of aspect 1, wherein the system information indicates that the UE is to use the second paging allocation scheme, and wherein the set of paging parameters indicates a single paging frame that is associated with the plurality of POs; and an initial radio frame of the plurality of contiguous radio frames aligns, in a time domain, with the single paging frame.

Aspect 4: The method of any of aspects 1 through 3, further comprising: receiving a DCI message indicating a second set of paging parameters, wherein the second set of paging parameters comprises one or more updated paging parameters for the UE to use for monitoring the one or more POs.

Aspect 5: The method of aspect 4, wherein the DCI message comprises a paging DCI message, a DCI message that schedules a paging message that comprises the second set of paging parameters, a DCI message comprising a paging early indication, a DCI message communicated via a common search space, or any combination thereof.

Aspect 6: The method of any of aspects 1 through 5, further comprising: determining a time domain location of the first PO within the plurality of POs based at least in part on the ID associated with the UE, wherein monitoring the first PO is based at least in part on determining the time domain location of the first PO.

Aspect 7: The method of any of aspects 1 through 6, wherein a starting time domain location of the plurality of contiguous radio frames is based at least in part on a start of the DRX cycle and a paging frame offset value, the paging frame offset value is indicated by the set of paging parameters.

Aspect 8: The method of any of aspects 1 through 7, further comprising: receiving a DCI message indicating a SSB muting pattern for the first PO, wherein the SSB muting pattern indicates to mute one or more SSBs of a plurality of SSBs associated with the first PO.

Aspect 9: The method of any of aspects 1 through 8, further comprising: determining a time domain location of a first radio frame comprising the first PO based at least in part on the set of paging parameters indicating a first paging frame, wherein the first paging frame indicates a starting radio frame associated with a set of POs comprising the first PO.

Aspect 10: The method of aspect 9, wherein the starting radio frame is the first radio frame; or the starting radio frame is a second radio frame that occurs prior to the first radio frame.

Aspect 11: The method of any of aspects 1 through 10, wherein the set of paging parameters comprises a quantity of paging frames included during the DRX cycle, a quantity of POs included in each paging frame of the quantity of paging frames, a duration corresponding to a paging cycle, an indication of an initial PMO within a PO, or any combination thereof.

Aspect 12: A method for wireless communications by a network entity, comprising: outputting system information comprising a set of paging parameters and an indication of whether a plurality of POs are allocated according to a first paging allocation scheme or a second paging allocation scheme during a DRX cycle, wherein: the first paging allocation scheme comprises the plurality of POs being distributed across a plurality of radio frames during the DRX cycle, wherein at least two of the plurality of radio frames are non-contiguous; and the second paging allocation scheme comprises the plurality of POs being distributed across a plurality of contiguous radio frames during the DRX cycle; and outputting, in accordance with the set of paging parameters and the first paging allocation scheme or the second paging allocation scheme, one or more paging transmissions to one or more UEs during corresponding POs of the plurality of POs, the corresponding POs being based at least in part on respective IDs associated with the one or more UEs.

Aspect 13: The method of aspect 12, wherein the system information indicates that the plurality of POs are allocated according to the second paging allocation scheme, and wherein the set of paging parameters indicates a plurality of paging frames, each paging frame of the plurality of paging frames associated with a respective subset of POs of the plurality of POs; and the plurality of contiguous radio frames comprise the plurality of paging frames.

Aspect 14: The method of aspect 12, wherein the system information indicates that the plurality of POs are allocated according to the second paging allocation scheme, and wherein the set of paging parameters indicates a single paging frame that is associated with the plurality of POs; and an initial radio frame of the plurality of contiguous radio frames aligns, in a time domain, with the single paging frame.

Aspect 15: The method of any of aspects 12 through 14, further comprising: outputting a DCI message indicating a second set of paging parameters, wherein the second set of paging parameters comprises one or more updated paging parameters for the one or more UEs to use for monitoring the corresponding POs.

Aspect 16: The method of aspect 15, wherein the DCI message comprises a paging DCI message, a DCI message that schedules a paging message that indicates the second set of paging parameters, a DCI message comprising a paging early indication, a DCI message communicated via a common search space, or any combination thereof.

Aspect 17: The method of any of aspects 12 through 16, wherein a starting time domain location of the plurality of contiguous radio frames is based at least in part on a start of the DRX cycle and a paging frame offset value, the paging frame offset value is indicated by the set of paging parameters.

Aspect 18: The method of any of aspects 12 through 17, further comprising: outputting a DCI message indicating a SSB muting pattern for the corresponding POs, wherein the SSB muting pattern indicates to mute one or more SSBs of a plurality of SSBs associated with the corresponding POs.

Aspect 19: The method of any of aspects 12 through 18, wherein the set of paging parameters comprises a quantity of paging frames included during the DRX cycle, a quantity of POs included in each paging frame of the quantity of paging frames, a duration corresponding to a paging cycle, an indication of an initial PMO within a PO, or any combination thereof.

Aspect 20: A UE for wireless communications, comprising one or more memories storing processor-executable code, and one or more processors coupled with the one or more memories and individually or collectively operable to execute the code to cause the UE to perform a method of any of aspects 1 through 11.

Aspect 21: A UE for wireless communications, comprising at least one means for performing a method of any of aspects 1 through 11.

Aspect 22: A non-transitory computer-readable medium storing code for wireless communications, the code comprising instructions executable by one or more processors to perform a method of any of aspects 1 through 11.

Aspect 23: A network entity for wireless communications, comprising one or more memories storing processor-executable code, and one or more processors coupled with the one or more memories and individually or collectively operable to execute the code to cause the network entity to perform a method of any of aspects 12 through 19.

Aspect 24: A network entity for wireless communications, comprising at least one means for performing a method of any of aspects 12 through 19.

Aspect 25: A non-transitory computer-readable medium storing code for wireless communications, the code comprising instructions executable by one or more processors to perform a method of any of aspects 12 through 19.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:
   one or more memories storing processor-executable code; and
   one or more processors coupled with the one or more memories and individually or collectively operable to execute the code to cause the UE to:
      receive system information comprising a set of paging parameters and an indication of whether the UE is to use a first paging allocation scheme or a second paging allocation scheme for monitoring one or more paging occasions during a discontinuous reception cycle of the UE, wherein:

the first paging allocation scheme comprises a plurality of paging occasions distributed across a plurality of radio frames during the discontinuous reception cycle, wherein at least two of the plurality of radio frames are non-contiguous; and the second paging allocation scheme comprises the plurality of paging occasions distributed across a plurality of contiguous radio frames during the discontinuous reception cycle; and monitor, in accordance with the set of paging parameters and the first paging allocation scheme or the second paging allocation scheme, a first paging occasion of the plurality of paging occasions based at least in part on an identifier associated with the UE and receiving the system information.

2. The UE of claim 1, wherein the system information indicates that the UE is to use the second paging allocation scheme, and wherein:

the set of paging parameters indicates a plurality of paging frames, each paging frame of the plurality of paging frames associated with a respective subset of paging occasions of the plurality of paging occasions; and the plurality of contiguous radio frames comprise the plurality of paging frames.

3. The UE of claim 1, wherein the system information indicates that the UE is to use the second paging allocation scheme, and wherein:

the set of paging parameters indicates a single paging frame that is associated with the plurality of paging occasions; and an initial radio frame of the plurality of contiguous radio frames aligns, in a time domain, with the single paging frame.

4. The UE of claim 1, wherein the one or more processors are individually or collectively further operable to execute the code to cause the UE to:

receive a downlink control information message indicating a second set of paging parameters, wherein the second set of paging parameters comprises one or more updated paging parameters for the UE to use for monitoring the one or more paging occasions.

5. The UE of claim 4, wherein the downlink control information message comprises a paging downlink control information message, a downlink control information message that schedules a paging message that comprises the second set of paging parameters, a downlink control information message comprising a paging early indication, a downlink control information message communicated via a common search space, or any combination thereof.

6. The UE of claim 1, wherein the one or more processors are individually or collectively further operable to execute the code to cause the UE to:

determine a time domain location of the first paging occasion within the plurality of paging occasions based at least in part on the identifier associated with the UE, wherein monitoring the first paging occasion is based at least in part on determining the time domain location of the first paging occasion.

7. The UE of claim 1, wherein a starting time domain location of the plurality of contiguous radio frames is based at least in part on a start of the discontinuous reception cycle and a paging frame offset value, wherein the paging frame offset value is indicated by the set of paging parameters.

8. The UE of claim 1, wherein the one or more processors are individually or collectively further operable to execute the code to cause the UE to:

receive a downlink control information message indicating a synchronization signal block muting pattern for the first paging occasion, wherein the synchronization signal block muting pattern indicates to mute one or more synchronization signal blocks of a plurality of synchronization signal blocks associated with the first paging occasion.

9. The UE of claim 1, wherein the one or more processors are individually or collectively further operable to execute the code to cause the UE to:

determine a time domain location of a first radio frame comprising the first paging occasion based at least in part on the set of paging parameters indicating a first paging frame, wherein the first paging frame indicates a starting radio frame associated with a set of paging occasions comprising the first paging occasion.

10. The UE of claim 9, wherein:

the starting radio frame is the first radio frame; or the starting radio frame is a second radio frame that occurs prior to the first radio frame.

11. The UE of claim 1, wherein the set of paging parameters comprises a quantity of paging frames included during the discontinuous reception cycle, a quantity of paging occasions included in each paging frame of the quantity of paging frames, a duration corresponding to a paging cycle, an indication of an initial physical downlink control channel monitoring occasion within a paging occasion, or any combination thereof.

12. A network entity for wireless communications, comprising:

one or more memories storing processor-executable code; and one or more processors coupled with the one or more memories and individually or collectively operable to execute the code to cause the network entity to:

output system information comprising a set of paging parameters and an indication of whether a plurality of paging occasions are allocated according to a first paging allocation scheme or a second paging allocation scheme during a discontinuous reception cycle, wherein:

the first paging allocation scheme comprises the plurality of paging occasions being distributed across a plurality of radio frames during the discontinuous reception cycle, wherein at least two of the plurality of radio frames are non-contiguous; and the second paging allocation scheme comprises the plurality of paging occasions being distributed across a plurality of contiguous radio frames during the discontinuous reception cycle; and output, in accordance with the set of paging parameters and the first paging allocation scheme or the second paging allocation scheme, one or more paging transmissions to one or more user equipments (UEs) during corresponding paging occasions of the plurality of paging occasions, the corresponding paging occasions being based at least in part on respective identifiers associated with the one or more UEs.

13. The network entity of claim 12, wherein the system information indicates that the plurality of paging occasions are allocated according to the second paging allocation scheme, and wherein:

the set of paging parameters indicates a plurality of paging frames, each paging frame of the plurality of paging frames associated with a respective subset of paging occasions of the plurality of paging occasions; and the plurality of contiguous radio frames comprise the plurality of paging frames.

14. The network entity of claim 12, wherein the system information indicates that the plurality of paging occasions are allocated according to the second paging allocation scheme, and wherein:

the set of paging parameters indicates a single paging frame that is associated with the plurality of paging occasions; and an initial radio frame of the plurality of contiguous radio frames aligns, in a time domain, with the single paging frame.

15. The network entity of claim 12, wherein the one or more processors are individually or collectively further operable to execute the code to cause the network entity to:

output a downlink control information message indicating a second set of paging parameters, wherein the second set of paging parameters comprises one or more updated paging parameters for the one or more UEs to use for monitoring the corresponding paging occasions.

16. The network entity of claim 15, wherein the downlink control information message comprises a paging downlink control information message, a downlink control information message that schedules a paging message that indicates the second set of paging parameters, a downlink control information message comprising a paging early indication, a downlink control information message communicated via a common search space, or any combination thereof.

17. The network entity of claim 12, wherein a starting time domain location of the plurality of contiguous radio frames is based at least in part on a start of the discontinuous reception cycle and a paging frame offset value, wherein the paging frame offset value is indicated by the set of paging parameters.

18. The network entity of claim 12, wherein the one or more processors are individually or collectively further operable to execute the code to cause the network entity to:

output a downlink control information message indicating a synchronization signal block muting pattern for the corresponding paging occasions, wherein the synchronization signal block muting pattern indicates to mute one or more synchronization signal blocks of a plurality of synchronization signal blocks associated with the corresponding paging occasions.

19. The network entity of claim 12, wherein the set of paging parameters comprises a quantity of paging frames included during the discontinuous reception cycle, a quantity of paging occasions included in each paging frame of the quantity of paging frames, a duration corresponding to a paging cycle, an indication of an initial physical downlink control channel monitoring occasion within a paging occasion, or any combination thereof.

20. A method for wireless communications by a user equipment (UE), comprising:

receiving system information comprising a set of paging parameters and an indication of whether the UE is to use a first paging allocation scheme or a second paging allocation scheme for monitoring one or more paging occasions during a discontinuous reception cycle of the UE, wherein:

the first paging allocation scheme comprises a plurality of paging occasions distributed across a plurality of radio frames during the discontinuous reception cycle, wherein at least two of the plurality of radio frames are non-contiguous; and the second paging allocation scheme comprises the plurality of paging occasions distributed across a plurality of contiguous radio frames during the discontinuous reception cycle; and monitoring, in accordance with the set of paging parameters and the first paging allocation scheme or the second paging allocation scheme, a first paging occasion of the plurality of paging occasions based at least in part on an identifier associated with the UE and receiving the system information.

21. The method of claim 20, wherein the system information indicates that the UE is to use the second paging allocation scheme, and wherein:

the set of paging parameters indicates a plurality of paging frames, each paging frame of the plurality of paging frames associated with a respective subset of paging occasions of the plurality of paging occasions; and the plurality of contiguous radio frames comprise the plurality of paging frames.

22. The method of claim 20, wherein the system information indicates that the UE is to use the second paging allocation scheme, and wherein:

the set of paging parameters indicates a single paging frame that is associated with the plurality of paging occasions; and an initial radio frame of the plurality of contiguous radio frames aligns, in a time domain, with the single paging frame.

23. The method of claim 20, further comprising:

receiving a downlink control information message indicating a second set of paging parameters, wherein the second set of paging parameters comprises one or more updated paging parameters for the UE to use for monitoring the one or more paging occasions.

24. The method of claim 23, wherein the downlink control information message comprises a paging downlink control information message, a downlink control information message that schedules a paging message that comprises the second set of paging parameters, a downlink control information message comprising a paging early indication, a downlink control information message communicated via a common search space, or any combination thereof.

25. The method of claim 20, further comprising:

determining a time domain location of the first paging occasion within the plurality of paging occasions based at least in part on the identifier associated with the UE, wherein monitoring the first paging occasion is based at least in part on determining the time domain location of the first paging occasion.

26. The method of claim 20, wherein a starting time domain location of the plurality of contiguous radio frames is based at least in part on a start of the discontinuous reception cycle and a paging frame offset value, wherein the paging frame offset value is indicated by the set of paging parameters.

27. The method of claim 20, further comprising:

receiving a downlink control information message indicating a synchronization signal block muting pattern for the first paging occasion, wherein the synchronization signal block muting pattern indicates to mute one or more synchronization signal blocks of a plurality of synchronization signal blocks associated with the first paging occasion.

28. The method of claim 20, further comprising:

determining a time domain location of a first radio frame comprising the first paging occasion based at least in part on the set of paging parameters indicating a first paging frame, wherein the first paging frame indicates a starting radio frame associated with a set of paging occasions comprising the first paging occasion.

29. The method of claim 28, wherein:

the starting radio frame is the first radio frame; or the starting radio frame is a second radio frame that occurs prior to the first radio frame.

30. A method for wireless communications by a network entity, comprising:

outputting system information comprising a set of paging parameters and an indication of whether a plurality of paging occasions are allocated according to a first paging allocation scheme or a second paging allocation scheme during a discontinuous reception cycle, wherein:

the first paging allocation scheme comprises the plurality of paging occasions being distributed across a plurality of radio frames during the discontinuous reception cycle, wherein at least two of the plurality of radio frames are non-contiguous; and the second paging allocation scheme comprises the plurality of paging occasions being distributed across a plurality of contiguous radio frames during the discontinuous reception cycle; and outputting, in accordance with the set of paging parameters and the first paging allocation scheme or the second paging allocation scheme, one or more paging transmissions to one or more user equipments (UEs) during corresponding paging occasions of the plurality of paging occasions, the corresponding paging occasions being based at least in part on respective identifiers associated with the one or more UEs.

* * * * *